US012612522B2

(12) United States Patent
Zhang et al.

(10) Patent No.: US 12,612,522 B2
(45) Date of Patent: Apr. 28, 2026

(54) NANOPARTICLE HYDROGELS

(71) Applicant: Khalifa University of Science and Technology, Abu Dhabi (AE)

(72) Inventors: TieJun Zhang, Abu Dhabi (AE); Afra Saeed Alketbi, Abu Dhabi (AE); Aikifa Raza, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 18/683,315

(22) PCT Filed: Oct. 17, 2022

(86) PCT No.: PCT/IB2022/059954
§ 371 (c)(1),
(2) Date: Feb. 13, 2024

(87) PCT Pub. No.: WO2023/067479
PCT Pub. Date: Apr. 27, 2023

(65) Prior Publication Data
US 2024/0368409 A1    Nov. 7, 2024

Related U.S. Application Data

(60) Provisional application No. 63/257,436, filed on Oct. 19, 2021.

(51) Int. Cl.
*C09D 4/06*    (2006.01)
*B29C 64/124*    (2017.01)
(Continued)

(52) U.S. Cl.
CPC .............. *C09D 4/06* (2013.01); *B29C 64/124* (2017.08); *B29C 64/194* (2017.08); *B33Y 10/00* (2014.12);
(Continued)

(58) Field of Classification Search
CPC .... B29C 64/124–135; C09D 7/62; C09D 7/67
See application file for complete search history.

(56) References Cited

U.S. PATENT DOCUMENTS

2007/0134902 A1* 6/2007 Bertino ................. G03F 7/2043
                                                     438/610
2016/0271178 A1* 9/2016 Hauser ................. A61K 9/0014
(Continued)

FOREIGN PATENT DOCUMENTS

CN        109880024 A      6/2019
CN        110103463 A      8/2019
(Continued)

OTHER PUBLICATIONS

Fantino, E. et al. (2016), 3D Printing of Conductive Complex Structures with In Situ Generation of Silver Nanoparticles. Adv. Mater., 28: 3712-3717.*

(Continued)

*Primary Examiner* — Alex A Rolland
(74) *Attorney, Agent, or Firm* — Billion & Armitage

(57)                ABSTRACT
A method of printing a hydrogel-based device includes contacting a monomer, a crosslinker, a photoinitiator, and a precursor salt with a solvent to form an ink solution, printing the ink solution onto a substrate, exposing the ink solution to light, sufficient to form a hydrogel, and contacting the hydrogel with a reducing agent sufficient to precipitate nanoparticles from the precursor salt in the hydrogel.

19 Claims, 22 Drawing Sheets

(51) Int. Cl.

| | |
|---|---|
| *B29C 64/194* | (2017.01) |
| *B29K 23/00* | (2006.01) |
| *B29K 33/00* | (2006.01) |
| *B29K 105/00* | (2006.01) |
| *B29K 105/16* | (2006.01) |
| *B29K 509/00* | (2006.01) |
| *B33Y 10/00* | (2015.01) |
| *B33Y 40/00* | (2020.01) |
| *B33Y 70/10* | (2020.01) |
| *C08F 290/06* | (2006.01) |
| *C09D 7/40* | (2018.01) |
| *C09D 7/61* | (2018.01) |
| *C09D 151/08* | (2006.01) |

(52) U.S. Cl.

CPC .............. *B33Y 40/00* (2014.12); *B33Y 70/10* (2020.01); *C08F 290/062* (2013.01); *C09D 7/61* (2018.01); *C09D 7/67* (2018.01); *C09D 151/08* (2013.01); *B29K 2023/08* (2013.01); *B29K 2033/00* (2013.01); *B29K 2033/26* (2013.01); *B29K 2105/0002* (2013.01); *B29K 2105/0061* (2013.01); *B29K 2105/162* (2013.01); *B29K 2509/00* (2013.01)

(56) References Cited

U.S. PATENT DOCUMENTS

| | | | |
|---|---|---|---|
| 2018/0117219 A1 * | 5/2018 | Yang ........................ | B29C 41/22 |
| 2018/0327279 A1 | 11/2018 | Yu et al. | |
| 2023/0285277 A1 * | 9/2023 | Sternberg ............. | A61K 31/375 |

FOREIGN PATENT DOCUMENTS

| | | | |
|---|---|---|---|
| CN | 112108084 A | | 12/2020 |
| CN | 109880024 B | * | 8/2021 |
| CN | 115356815 A | | 11/2022 |

OTHER PUBLICATIONS

Machine translation of CN 109880024 B, no date.*

Wikipedia entry for Iron(II, III)oxide, no date.*

International Search Report and Written Opinion Received mailed on Feb. 3, 2023, for PCT Application No. PCT/IB2022/059954, 8 Pages.

Cabane, Etienne , et al., "Stimuli-Responsive Polymers and Their Applications in Nanomedicine", Biointerphases (2012) 7:9.

Geng, Hongya , et al., "Plant leaves inspired sunlight-driven purifier for high-efficiency clean water production", Nature Communications, 2019, 10 pages.

Jiao, Tifeng , et al., "Reduced Graphene Oxide-Based Silver Nanoparticle-Containing Composite Hydrogel as Highly Efficient Dye Catalysts for Wastewater Treatment", Scientific Reports, Jul. 17, 2015, 12 pages.

Lee, Wang Hee , et al., "Floatable photocatalytic hydrogel nanocomposites for large-scale solar hydrogen production", Nature Nanotechnology | vol. 18 | Jul. 2023 | 754-762.

Li, Tingxian , et al., "Scalable and efficient solar-driven atmospheric water harvesting enabled by bidirectionally aligned and hierarchically structured nanocomposites", Nature Water | vol. 1 | Nov. 2023 | 971-981.

Nadernezhad, Ali , et al., "Multifunctional 3D printing of heterogeneous hydrogel structures", Scientific Reports, Sep. 15, 2016, 12 pages.

Sayed, Asmaa , et al., "Green starch/graphene oxide hydrogel nanocomposites for sustained release applications", Chemical Papers (2022) 76:5119-5132.

Schmaljohann, Dirk , "Thermo- and pH-responsive polymers in drug delivery", Advanced Drug Delivery Reviews 58 (2006) 1655-1670.

Wei, Characterizationwei , et al., "A novel thermo-responsive hydrogel based on salecan andpoly(N-isopropylacrylamide): Synthesis and characterization", Colloids and Surfaces B: Biointerfaces 125 (2015) 1-11.

Zhao, Fei , et al., "Highly efficient solar vapour generation via hierarchically nanostructured gels", Nature Nanotechnology | vol. 13 | Jun. 2018 | 489-495.

Zhou, Wei , et al., "3D inverted cone hydrogels derived by MXene-TiOX nanocomposite for sequential regulation of enhanced solar-driven steam generation", Next Nanotechnology 5 (2024) 100040.

* cited by examiner

110  CONTACT A MONOMER, A CROSSLINKER, A PHOTOINITIATOR, AND A PRECURSOR SALT WITH A SOLVENT TO FORM AN INK SOLUTION

120  PRINT THE INK SOLUTION ONTO A SUBSTRATE

130  EXPOSE THE INK SOLUTION TO LIGHT, SUFFICIENT TO FORM A HYDROGEL

140  CONTACT THE HYDROGEL WITH A REDUCING AGENT SUFFICIENT TO PRECIPITATE NANOPARTICLES FROM THE PRECURSOR SALT IN THE HYDROGEL

NANOPARTICLE HYDROGELS

CROSS-REFERENCE TO RELATED APPLICATION

This application claims benefit of U.S. Provisional Application No. 63/257,436 filed on 19 Oct. 2021. U.S. Provisional Application No. 63/257,436 is incorporated herein by reference. A claim of priority is made.

BACKGROUND

Hydrogels are recognized as one of the most promising functional materials, as they are dynamic, tunable, biocompatible, biodegradable, and capable of encapsulating significant water content. Owing to these unique characteristics, hydrogel-based devices and systems are revolutionizing many applications, including artificial organs by mimicking the extracellular matrix of connective tissues, drug delivery for controlled drug release, soft electronics as actuators, enhanced water evaporation and purification, efficient plant uptake of fertilizers in agriculture, and as thickening agents for cosmetics.

Although hydrogels have a wide base for potential applications, their deployment is limited by the traditional processing methods, mainly molding for 3D geometries.

SUMMARY

According to one aspect, a method of printing a hydrogel-based device includes contacting a monomer, a crosslinker, a photoinitiator, and a precursor salt with a solvent to form an ink solution, printing the ink solution onto a substrate, exposing the ink solution to light, sufficient to form a hydrogel, and contacting the hydrogel with a reducing agent sufficient to precipitate nanoparticles from the precursor salt in the hydrogel.

According to another aspect, a method of printing a hydrogel-based device includes contacting a first monomer, a first crosslinker, and a first photoinitiator with a first solvent to form a first ink solution, printing the first ink solution onto a substrate, and exposing the first ink solution to light, sufficient to form a base hydrogel layer. The method further includes contacting a second monomer, a second crosslinker, a second photoinitiator, and a precursor salt with a second solvent to form a second ink solution, printing the second ink solution onto the base hydrogel layer, and exposing the second ink solution to light, sufficient to form one or more additional hydrogel layers. The method further includes contacting at least one of the one or more additional hydrogel layers with a reducing agent sufficient to precipitate nanoparticles from the precursor salt in the one or more additional hydrogel layers.

According to another aspect, a solar vapor generation device includes a hydrogel foam layer, one or more first hydrogel layers, and one or more second hydrogel layers, wherein the one or more first hydrogel layers are crosslinked and the one or more second hydrogel layers include nanoparticles.

BRIEF DESCRIPTION OF DRAWINGS

This written disclosure describes illustrative embodiments that are non-limiting and non-exhaustive. Reference is made to illustrative embodiments that are depicted in the figures, in which.

DETAILED DESCRIPTION

Embodiments of the present disclosure describe a novel approach to fabricate a 3D structure from photocurable monomers and crosslinkers. Metal salts as precursors of nanoparticles may be added into printing ink to develop nanoparticles post-printing. As a result, the disadvantages associated with the direct incorporation of nanoparticles in ink are avoided, including scattering, agglomeration, and loss of printing resolution.

Figure 1:
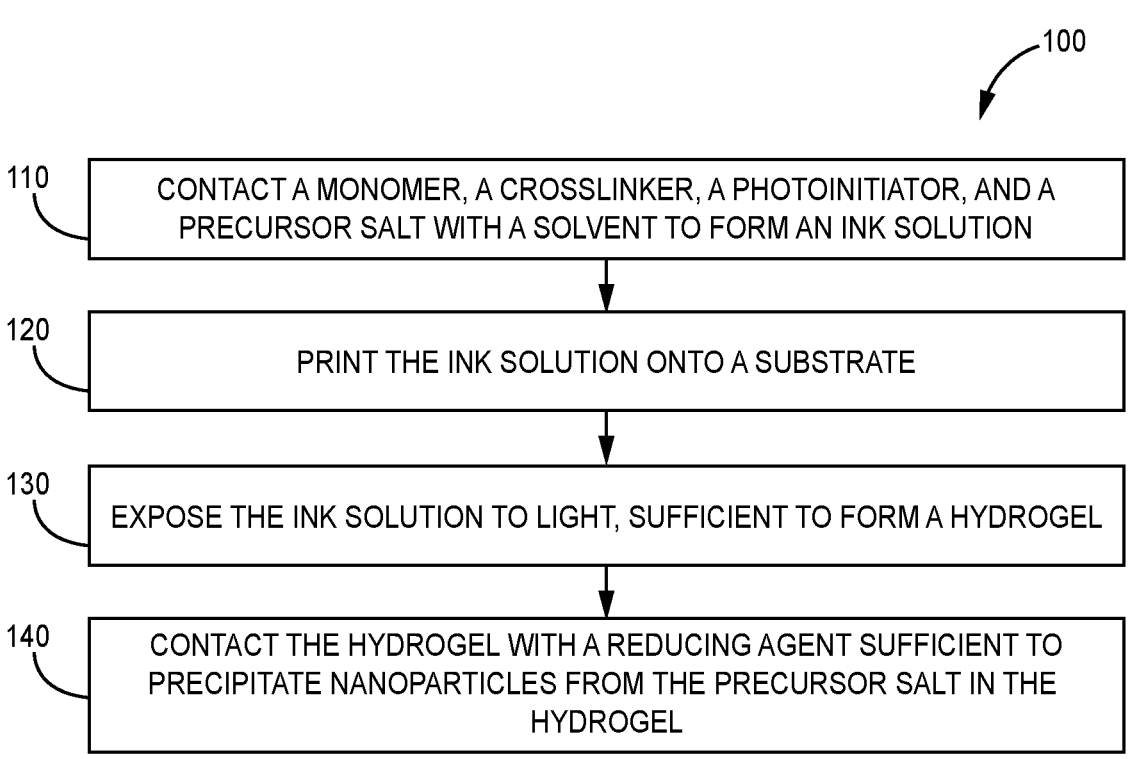
FIG. 1 illustrates a method 100 of printing a hydrogel-based device, according to some embodiments.

Referring to FIG. 1, a method 100 of printing a hydrogel-based device is illustrated, according to some embodiments. The method 100 includes the following steps:

STEP 110, CONTACT A MONOMER, A CROSS-LINKER, A PHOTOINITIATOR, AND A PRECURSOR SALT WITH A SOLVENT TO FORM AN INK SOLUTION, includes contacting, such as mixing and dissolving, a monomer, such as an acrylamide monomer, a crosslinker, a photoinitiator, and a precursor salt with a solvent to form an ink solution. The monomer, crosslinker, and photoinitiator may be mixed with the solvent before adding the precursor salt. In one example, the monomer may be an acrylamide monomer or acrylic-based hydrogel. For example, the monomer may be N-isopropylacrylamide. In another example, the monomer is sufficient to form a polymer for uptaking a reducing agent. In yet another example, the monomer is sufficient to form a porous polymer network. The crosslinker may include poly(ethylene glycol) diacrylate (PEGDA) or N,N'-Methylenebis(acrylamide). In one example, the photoinitiator may be 2,4,6-trimethylbenzoyl-diphenylphosphine oxide (TPO). For example, the photoinitiator may include water-dispersible nanoparticles of 2,4,6-trimethylbenzoyl-diphenylphosphine oxide (TPO). In another example the photoinitiator may be 2-Hydroxy-2-methylpropiophenone. The precursor salt may be one or more of $Fe(NO_3)_3$, $FeCl_2$, $FeCl_3$, $FeSO_4$, $Fe_2(SO_4)$, $Cu(NO_3)_2$, $Zn(NO_3)_2$, $Zn(CH_3CO_2)_2$, $NiSO_4$ and $Ag(NO_3)_2$. The precursor salt may be two or more of $Fe(NO_3)_3$, $FeCl_2$, $FeCl_3$, $FeSO_4$, $Fe_2(SO_4)$, $Cu(NO_3)_2$, $Zn(NO_3)_2$, $Zn(CH_3CO_2)_2$, and $Ag(NO_3)_2$. For example, the precursor salt may be $Fe(NO_3)_3$ and $FeCl_2$. The solvent may be water or other organic solvents such as ethanol and water-ethanol mixtures. The ink solution may be an ink sufficient to be printed.

Other examples of acrylamide monomers include N-(Butoxymethyl)acrylamide, N,N-Dimethylacrylamide, N-tert-Butylacrylamide, N,N'-Methylenebisacrylamide, N-(Hydroxymethyl)acrylamide, N-(1,1,3,3-Tetramethylbutyl)acrylamide, (3-Acrylamidopropyl)trimethylammonium Chloride, N-[3-(Dimethylamino)propyl]acrylamide, N-Dodecylacrylamide. N,N'-(1,2-Dihydroxyethylene)bisacrylamide, N-(Isobutoxymethyl)acrylamide, N-Propylacrylamide, N-Butylacrylamide, 3-[(3-Acrylamidopropyl) dimethylam-monio]propane-1-sulfonate, N-(Methoxymethyl)acrylam-ide, N-[2-(Dimethylamino)ethyl]acrylamide, N-[2-(Diethylamino)ethyl]acrylamide, Diacetone Acrylamide, 6-Acrylamido-β-cyclodextrin, N-(2-Hydroxyethyl)acrylam-ide, N,N-Diethylacrylamide, 6-Acrylamidohexanoic Acid, and 4-Acryloylmorpholine.

The ratios of the monomer, the crosslinker, the photoini-tiator, and the precursor salt can be changed depending on the desired properties. In one example, the amount of the crosslinker and the photoinitiator can be reduced while the solvent is increased to create a more porous (less cross-linked) network. In another example, the salt precursor concentration may be increased to increase the concentration of nanoparticles produced.

Optionally, an absorber dye may be added to the ink solution. For example, Sudan I, Mordant Orange, Pyra-zolone, or Chlorophyll dye may be added to the solution. The dye can be utilized to control light penetration depth in a printing process;

STEP 120, PRINT THE INK SOLUTION ONTO A SUBSTRATE, includes printing the ink solution onto a substrate such as a foam, membrane, or flat non-porous surface. The color of the ink solution can be utilized to control the light penetration depth of a printer. This can assist in controlling the thickness of the printed solution. In one example, printing may include laser Stereolithography (SLA) 3D-printing. In another example, printing includes Digital Light Processing (DLP) and projection micro-Ste-reolithography (PμSL) 3D-printing. Printing may include any light-based curing process for additively manufacturing a device on the substrate. In one example, the substrate may include hydrogel foam, graphene oxide foam, and carbon foam. The substrate may be a PEGDA foam. PEGDA foam may be created using a solution of PEGDA with water-dispersible nano-TPO. In another example, the substrate may include PVDF membranes, cellulose membranes, glass slides, Silicon wafers, and Mica. In yet another example, the substrate may include a metal substrate such as copper or aluminum sheets. In one example, the substrate does not contain any nanoparticles;

STEP 130, EXPOSE THE INK SOLUTION TO LIGHT, SUFFICIENT TO FORM A HYDROGEL, includes expos-ing the ink solution to light during or after the printing step, sufficient to form the hydrogel. In one example, the light emitted during the printing step is sufficient to form the hydrogel via a photopolymerization process. The light can be used to cure the ink solution. In one example, the light can be an ultraviolet laser. Step 130 may further include addi-tional laser exposure to fully cure the ink solution post-printing;

STEP 140, CONTACT THE HYDROGEL WITH A REDUCING AGENT SUFFICIENT TO PRECIPITATE NANOPARTICLES FROM THE PRECURSOR SALT IN THE HYDROGEL, includes contacting, such as mixing and dissolving, the hydrogel with a reducing agent such as a base sufficient to precipitate/coprecipitate nanoparticles from the precursor salt in the hydrogel. In one example, the reducing agent is one or more of $NH_4OH$, KOH, KCl, NaOH, and $NaBH_4$. In another example, the reducing agent may be about 5 wt % to about 15 wt % base solution of an aqueous base. For example, the reducing agent may be about 10 wt % base solution of an aqueous base. The reducing agent may be a base sufficient for precipitation/coprecipitation of the precursor salt.

Precipitation may include coprecipitation. Precipitation/coprecipitation of nanoparticles can occur by swelling the hydrogel in a base solution. In one non-limiting example, precipitation of metal ions can occur by swelling the hydro-gel in a 10 wt % base solution. This precipitation forms nanoparticles in the hydrogel.

In one example, the nanoparticles may be metal oxide nanoparticles such as iron oxide nanoparticles. For example, iron oxide nanoparticles may be one or more of wustite nanoparticles, magnetite nanoparticles, hematite nanopar-ticles, and maghemite nanoparticles. In another example, the iron oxide nanoparticles may be a combination of any one of wustite nanoparticles, magnetite nanoparticles, hematite nanoparticles, and maghemite nanoparticles. In yet another example, the nanoparticles may be one or more of copper oxide nanoparticles, zinc oxide nanoparticles, silver nan-oparticles, and nickel oxide nanoparticles.

Figure 2:
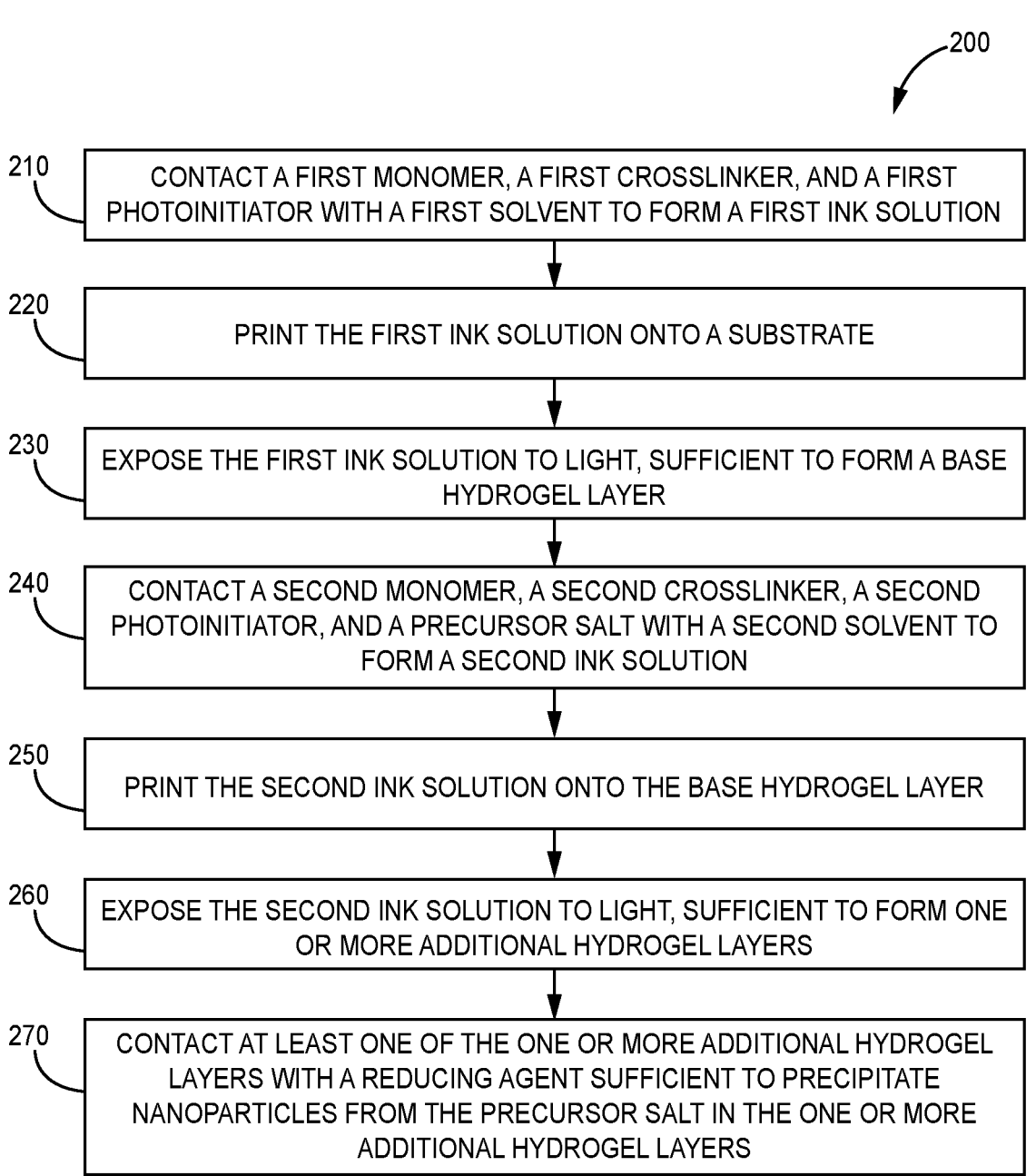
FIG. 2 illustrates a method 200 of printing a hydrogel-based device, according to some embodiments.

FIG. 2 illustrates a method 200 of printing a hydrogel-based device, according to some embodiments. The method 200 includes the following steps:

STEP 210, CONTACT A FIRST MONOMER, A FIRST CROSSLINKER, AND A FIRST PHOTOINITIATOR WITH A FIRST SOLVENT TO FORM A FIRST INK SOLUTION, includes contacting, such as mixing and dis-solving, a first monomer, such as an acrylamide monomer, a first crosslinker, and a first photoinitiator with a first solvent to form a first ink solution. In one example, the first monomer may be an acrylamide monomer or acrylic-based hydrogel. For example, the first monomer may be N-iso-propylacrylamide. In another example, the first monomer is sufficient to form a polymer for uptaking a reducing agent. In yet another example, the first monomer is sufficient to form a porous polymer network.

The first crosslinker may include PEGDA or N,N'-Meth-ylenebis(acrylamide). In one example, the first photoinitia-tor may include TPO. For example, the first photoinitiator may include water-dispersible nanoparticles of TPO. In another example, the first photoinitiator may include 2-Hy-droxy-2-methylpropiophenone. The first solvent may be water or other organic solvents such as ethanol and water-ethanol mixtures. The first monomer, first crosslinker, first photoinitiator, and first solvent may be mixed to form the first solution.

The ratios of the first monomer, the first crosslinker, and the first photoinitiator can be changed depending on the desired properties. In one example, the amount of the first crosslinker and the first photoinitiator can be reduced while the first solvent is increased to create a more porous (less crosslinked) network.

Optionally, an absorber dye may be added to the first ink solution. For example, Sudan I, Mordant Orange, Pyra-zolone, or Chlorophyll dye may be added to the first ink solution. The dye can be utilized to control light penetration depth in a printing process;

STEP 220, PRINT THE FIRST INK SOLUTION ONTO A SUBSTRATE, includes printing the first ink solution onto a substrate such as a foam, membrane, or flat non-porous surface. The first ink solution may be a photocurable and/or temperature-responsive hydrogel. In one example, printing may include SLA 3D-printing, DLP, and PμSL 3D-printing. Printing may include any process for additively manufac-turing a device on the substrate. In one example, printing operates at ambient conditions. Interconnected microchan-nels may be printed. In one example, the initial few layers printed may be slightly printed within the substrate to ensure adhesion to the substrate and proper structural stability. The substrate may be a PEGDA foam. PEGDA foam may be created using a solution of PEGDA with water-dispersible nano-TPO. This solution may be mixed with a solution of water diluted acetic acid and sodium dodecyl sulfate (SDS). Once the two solutions are mixed sodium bicarbonate may be added to form a synthesized foam. The substrate may include PVDF membranes, cellulose membranes, glass slides, Silicon wafers, and Mica. The substrate may include a metal substrate such as copper or aluminum sheets. In one example, the substrate does not contain any nanoparticles. A foam can be advantageous as a substrate as it can act as a water wick;

STEP 230, EXPOSE THE FIRST INK SOLUTION TO LIGHT, SUFFICIENT TO FORM A BASE HYDROGEL LAYER, includes exposing the first ink solution to light during or after the printing process, sufficient to form a base hydrogel layer. The color of the first ink solution can be utilized to control the light penetration depth of a printer. The base hydrogel layer may have printed interconnected microchannels. The base hydrogel layer may have a microporous surface. The base hydrogel layer may have elliptical pores. In one example, the light emitted during the printing step is sufficient to form the base hydrogel layer via a photopolymerization process. The base hydrogel layer may include more than one layer on top of one another. In one nonlimiting example, the base hydrogel layer includes a crosslinked layer with microchannels and a hydrogel layer without nanoparticles. The light can be used to cure the first ink solution. Steps 210, 220, and 230 may be repeated in cycles sufficient to form a hybrid structure. In one example, the light can be an ultraviolet laser. Step 230 may further include additional laser passes to fully cure the first ink solution;

STEP 240, CONTACT A SECOND MONOMER, A SECOND CROSSLINKER, A SECOND PHOTOINITIATOR, AND A PRECURSOR SALT WITH A SECOND SOLVENT TO FORM A SECOND INK SOLUTION, includes contacting, such as mixing and dissolving, a second monomer, such as an acrylamide monomer, a second crosslinker, a second photoinitiator, and a precursor salt with a second solvent to form a second ink solution. The second monomer may be the same or different monomer as the first monomer. The second crosslinker may be the same or different crosslinker as the first crosslinker. The second photoinitiator may be the same or different photoinitiator as the first photoinitiator. The second solvent may be the same or different solvent as the first solvent. The precursor salt may be one or more of $Fe(NO_3)_3$, $FeCl_2$, $FeCl_3$, $FeSO_4$, $Fe_2(SO_4)$, $Cu(NO_3)_2$, $Zn(NO_3)_2$, $Zn(CH_3CO_2)_2$, $NiSO_4$ and $Ag(NO_3)_2$. The precursor salt may be two or more of $Fe(NO_3)_3$, $FeCl_2$, $FeCl_3$, $FeSO_4$, $Fe_2(SO_4)$, $Cu(NO_3)_2$, $Zn(NO_3)_2$, $Zn(CH_3CO_2)_2$, and $Ag(NO_3)_2$. For example, the precursor salt may be $Fe(NO_3)_3$ and $FeCl_2$. The precursor salt may be a metallic precursor salt;

STEP 250, PRINT THE SECOND INK SOLUTION ONTO THE BASE HYDROGEL LAYER, includes printing the second ink solution onto the base hydrogel layer with a printing process. In one example, printing may include micro 3D-printing. In another example, printing may include SLA 3D-printing, DLP, and PμSL 3D-printing. Printing may include any process for additively manufacturing a device on the substrate;

STEP 260, EXPOSE THE SECOND INK SOLUTION TO LIGHT, SUFFICIENT TO FORM ONE OR MORE ADDITIONAL HYDROGEL LAYERS, includes exposing the second ink solution to light during or after the printing process. The color of the second ink solution can be utilized to control the light penetration depth of a printer. This step forms one or more additional hydrogel layers. At least one of the one or more additional hydrogel layers is in contact with the base hydrogel layer or one of the base hydrogel layers if the base hydrogel layer includes more than one layer. In one example, the light emitted during the printing step is sufficient to form the one or more additional hydrogel layers via a photopolymerization process. The light can be used to cure second the ink solution. In one example, the light can be an ultraviolet laser. Steps 240, 250, and 260 may be repeated in cycles sufficient to form a hybrid structure. Step 260 may further include additional laser passes to fully cure the ink solution;

STEP 270, CONTACT AT LEAST ONE OF THE ONE OR MORE ADDITIONAL HYDROGEL LAYERS WITH A REDUCING AGENT SUFFICIENT TO PRECIPITATE NANOPARTICLES FROM THE PRECURSOR SALT IN THE ONE OR MORE ADDITIONAL HYDROGEL LAYERS, includes contacting at least one of the one or more additional hydrogel layers with a reducing agent such as a base, sufficient to precipitate/coprecipitate nanoparticles, such as metal oxide nanoparticles, from the precursor salt in the one or more additional hydrogel layers. For example, there may be 1 additional hydrogel layer or there may be 2, 3, 4, or more additional hydrogel layers. For example, the one or more additional hydrogel layers may include 2 or more layers with different concentrations of nanoparticles. In one example, the reducing agent is one or more of $NH_4OH$, $KOH$, $KCl$, $NaOH$, and $NaBH_4$. In another example, the reducing agent may be about 5 wt % to about 15 wt % base solution of an aqueous base. For example, the reducing agent may be about 10 wt % base solution of an aqueous base. The reducing agent may be a base sufficient for coprecipitation of the precursor salt. If there are two or more hydrogel layers, the hydrogel layers may have different concentrations of nanoparticles. The one or more additional hydrogel layers may become a black color after coprecipitation. This color can be beneficial for high solar absorption. Any step of method 200 may be repeated to form a hybrid structure. For example, different layers may be added on top of one another. In this example, a layer without nanoparticles may be on top or below a layer with nanoparticles. Further, a crosslinked layer with microchannels may be in contact with the substrate and there may be additional crosslinked layers in any portion of the hybrid structure. These steps may occur in any order with or without precursor salts to form a hybrid structure. The steps may be repeated with various ink formulations to vary the hybrid structure.

Figure 3:
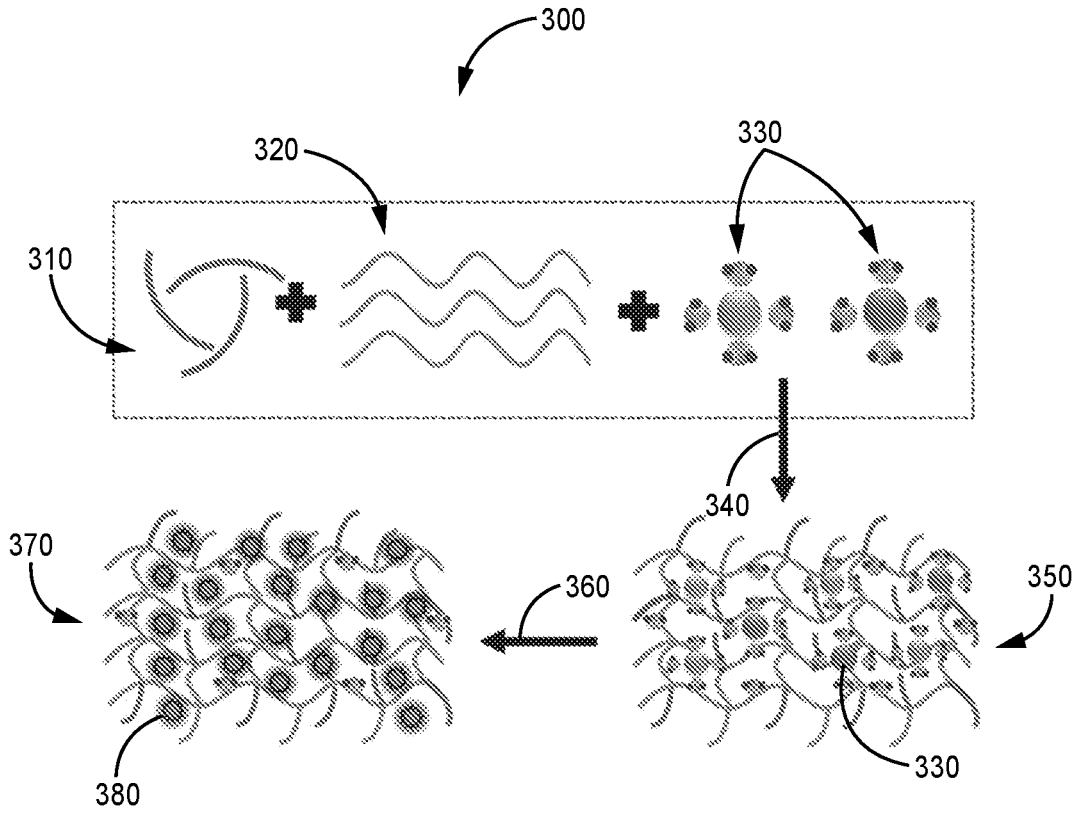
FIG. 3 illustrates a schematic of a process 300 for forming hydrogels with nanoparticles formed post-printing, according to some embodiments.

FIG. 3 illustrates a schematic of process 300 of forming hydrogels with nanoparticles formed post-printing. FIG. 3 shows process 300, monomer 310, crosslinker 320, precursor salt 330, crosslinking 3D printing 340, as-printed hydrogel 350, alkalinizing process 360, nanoparticle hydrogel 370, and nanoparticles 380. Monomer 310 may include more than one type of monomer. Monomer 310, crosslinker 320, and precursor salt 330 may be the same as listed in method 100 or method 200 and may be mixed with a solvent. Monomer 310 may include a plurality of monomers. Crosslinker 320 may include more than one type of crosslinker. Crosslinker 320 may include a plurality of crosslinkers. Precursor salt 330 may include various different types of precursor salts. Precursor salt 330 may be a plurality of the same precursor salts. Crosslinking 3D printing 340 may include a photo-polymerization process upon light exposure. Crosslinking 3D printing 340 may include exposing monomer 310, crosslinker 320, and precursor salt 330 to UV light sufficient to crosslink this ink to form a hydrogel. The as-printed hydrogel 350 is formed from the crosslinking 3D printing 340.

The as-printed hydrogel 350 includes precursor salt 330. The as-printed hydrogel 350 may be printed on any appropriate substrate to create a hybrid structure. Anisotropy can be introduced in the as-printed hydrogel 350 by changing the printing ink in accordance with the desired functionality of the printed layer. Alkalinizing process 360 includes using a base to coprecipitate or precipitate nanoparticles 380 in the nanoparticle hydrogel 370. Coprecipitation can occur when exposing the as-printed hydrogel 350 to alkalinizing process 360. Alkalinizing process 360 may include swelling the as-printed hydrogel 350 in a base.

Process 300 with iron oxide nanoparticles may be used for applications such as broadband light absorption, photovoltaic film coatings, fuel cells, batteries, magnetic storage media, drug delivery, magnetic hyperthermia, magnetic separation, controlled drug release, and antibacterial applications. Process 300 with copper oxide nanoparticles may be used for applications such as antimicrobial agents, solar energy transformation, photothermal applications, magnetic storage media, and gas sensor applications. Process 300 with nickel oxide nanoparticles may be used for applications such as batteries, catalyst-based energy applications, and gas and temperature sensor applications. Process 300 with zinc oxide nanoparticles may be used for applications such as catalysts, gas sensing, piezoelectric devices, UV-shielding material, and drug delivery applications. Silver nanoparticles may be used for applications such as biomedical applications, sensing, and photothermal conversion applications.

Figure 4:
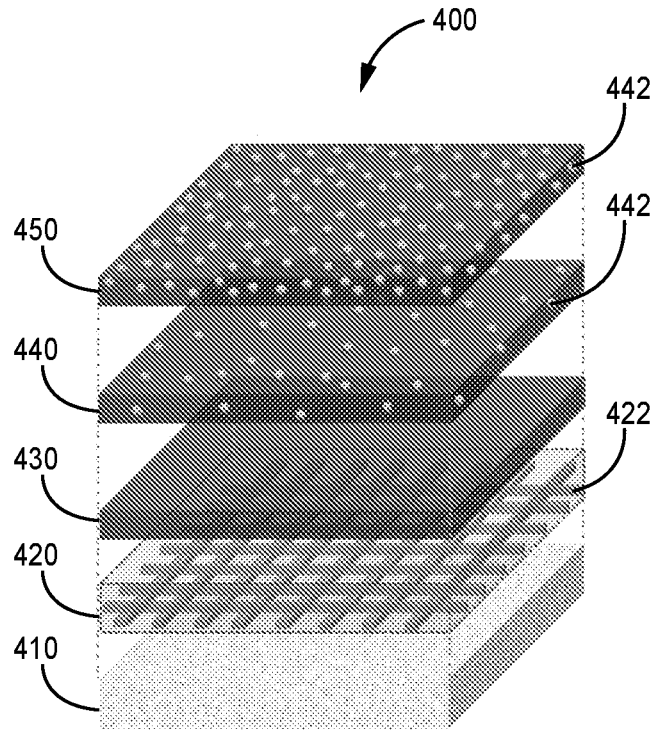
FIG. 4 illustrates layers in a hybrid structure 400 of a hydrogel-based device, according to some embodiments.

FIG. 4 illustrates possible layers in a hybrid structure 400 of a hydrogel-based device. FIG. 4 shows hybrid structure 400, substrate 410, structured hydrogel 420, microchannels 422, hydrogel 430, first hydrogel with nanoparticles 440, nanoparticles 442, and second hydrogel with nanoparticles 450. Any layer in hybrid structure 400 may be created using a 3D printer, such as a stereolithography 3D printer. Hybrid structure 400 may be formed with the selective introduction of nanoparticles 442 and can be heavily populated with nanoparticles 442. In one example, substrate 410, structured hydrogel 420, hydrogel 430, first hydrogel with nanoparticles 440, and second hydrogel with nanoparticles 450 are all present in hybrid structure 400. In another example, substrate 410, structured hydrogel 420, and one or more of first hydrogel with nanoparticles 440 and second hydrogel with nanoparticles 450 are present in hybrid structure 400. In yet another example, substrate 410, structured hydrogel 420, and second hydrogel with nanoparticles 450 are present in hybrid structure 400.

Anisotropy can be introduced in a printed structure by changing the printing ink in accordance with desired functionality of the printed layer. In one example, stereolithography 3D-printing can be used along with altering the printing ink formulation to form hybrid structure 400. Substrate 410 may include a foam, membrane, or flat nonporous surface. Substrate 410 may be a superhydrophilic PEGDA foam. In one example, substrate 410 does not contain any nanoparticles. Substrate 410 may be porous to allow for liquid movement through the pores.

Structured hydrogel 420 may have microchannels 422. These microchannels 422 may be interconnected microchannels. Structured hydrogel 420 may have a micro-porous surface and may not include any nanoparticles. Structured hydrogel 420 may allow for liquid movement, such as water transport, through microchannels 422. Structured hydrogel 420 may allow for liquid movement from substrate 410 to hydrogel 430. Microchannels 422 may network to facilitate liquid transport and maintain hydration at a surface in the hybrid device 400. In one example, microchannels 422 facilitate water transport and maintain hydration at the second hydrogel with nanoparticles 450. Structured hydrogel 420 may be partially printed within substrate 410 to ensure adhesion to substrate 410 and to ensure proper structural stability.

In one example, microchannels 422 may have a thickness of about 1.5 mm. In another example, microchannels 422 may have a thickness less than 1.5 mm or greater than 1.5 mm. In one example, microchannels 422 may be 0.05 mm to 0.3 mm wide. For example, microchannels 422 may be about 0.12 mm wide. In one example, microchannels 422 occupy 10% to 80% of the structured hydrogel 420 volume. In another example, microchannels 422 occupy 30% to 60% of the structured hydrogel 420 volume. For example, microchannels 422 may occupy about 43% of the structured hydrogel 420 volume. The thickness and width of microchannels 422 may be adjusted to facilitate adequate liquid transport.

Hydrogel 430 may be nanoparticle free. Hydrogel 430 may be formed with a monomer, a crosslinker, and a photoinitiator. Hydrogel 430 may be formed with a monomer, a crosslinker, a photoinitiator, and a precursor salt without using a reducing agent. First hydrogel with nanoparticles 440 may be formed with a monomer, a crosslinker, a photoinitiator, and a precursor salt. First hydrogel with nanoparticles 440 may be swelled with a reducing agent to precipitate/coprecipitate nanoparticles 442.

Second hydrogel with nanoparticles 450 may be formed with a monomer, a crosslinker, a photoinitiator, and a precursor salt. Second hydrogel with nanoparticles 450 may be swelled with a reducing agent to precipitate/coprecipitate nanoparticles 442. While second hydrogel with nanoparticles 450 is shown with a higher concentration of nanoparticles compared to first hydrogel with nanoparticles 440, the concentrations of nanoparticles 442 may be substantially equal or second hydrogel with nanoparticles 450 may have a lower concentration of nanoparticles 442. The concentrations of nanoparticles 442 may be adjusted by increasing or decreasing the concentration of dissolved salts prior to printing. All layers in hybrid structure 400 may allow for liquid transport. Liquid transport can assist in maintaining hydration in any of the layers in hybrid structure 400. Microchannels 422 may be present in any portion of hybrid structure 400 to assist as open evaporation and stress relieving sites.

In one example, substrate 410 may have a thickness ranging from 2 mm to 5 mm. In another example, substrate 410 may have a thickness less than 2 mm or greater than 5 mm. In one example, structured hydrogel 420 may have a thickness of about 2 mm. In another example, structured hydrogel 420 may have a thickness less than 2 mm or greater than 2 mm. In one example, hydrogel 430 may have a thickness of about 1.5 mm. In another example, hydrogel 430 may have a thickness less than 1.5 mm or greater than 1.5 mm. In one example, first hydrogel with nanoparticles 440 may have a thickness of about 0.5 mm. In another example, first hydrogel with nanoparticles 440 may have a thickness less than 0.5 mm or greater than 0.5 mm. In one example, second hydrogel with nanoparticles 450 may have a thickness of about 0.5 mm. In another example, second hydrogel with nanoparticles 450 may have a thickness less than 0.5 mm or greater than 0.5 mm.

Figures 5A, 5B, 5C, 5D:
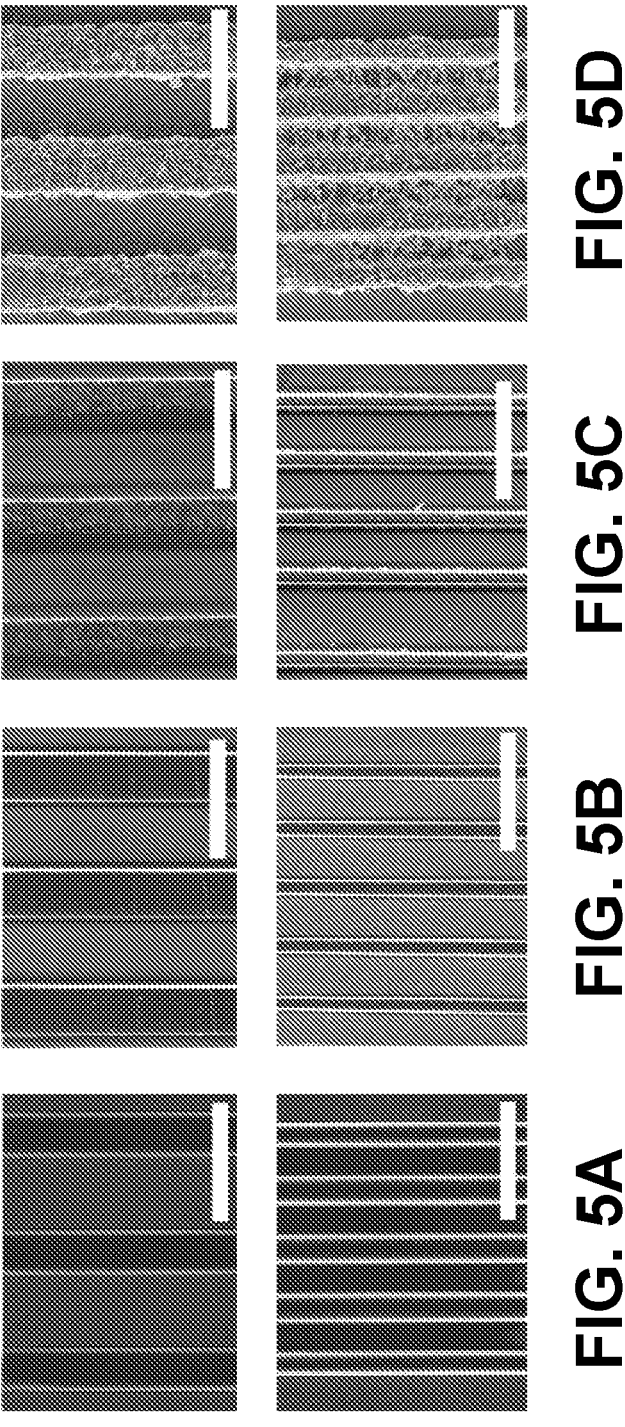
FIG. 5A illustrates scanning electron microscopic (SEM) images of 3D-printed hydrogels using ink without additives, according to some embodiments.
FIG. 5B illustrates SEM images of 3D-printed hydrogels with salt precursor before development of $Fe_3O_4$ nanoparticles, according to some embodiments.
FIG. 5C illustrates SEM images of 3D-printed hydrogels with salt precursor after development of $Fe_3O_4$ nanoparticles, according to some embodiments.
FIG. 5D illustrates SEM images of 3D-printed hydrogel ink with $Fe_3O_4$ nanoparticles dispersed prior to printing, according to some embodiments.

FIG. 5A illustrates scanning electron microscopic (SEM) images of 3D-printed hydrogels with an ink without any precursor salt. FIG. 5B illustrates SEM images of 3D-printed hydrogels with precursor salt before development of $Fe_3O_4$ nanoparticles. FIG. 5C illustrates SEM images of 3D-printed hydrogels with precursor salt after development of $Fe_3O_4$ nanoparticles. FIG. 5D illustrates SEM images of 3D-printed hydrogel with $Fe_3O_4$ nanoparticles that were dispersed prior to printing. FIGS. 5A-5D illustrate that the direct incorporation of nanoparticles (prior to printing) causes the loss of resolution in 3D printed structures especially for high-resolution features. When nanoparticles are developed after the printing process, the nanoparticles may be localized on the hydrogel and the resolution may be maintained. The loss of resolution is attributed to the light scattering of a curing laser light caused by nanoparticles in the ink. The extent of scattering is dependent on the type and size of the nanoparticles, as well as the refractive index of the surrounding medium.

Figures 6A, 6B, 6C:
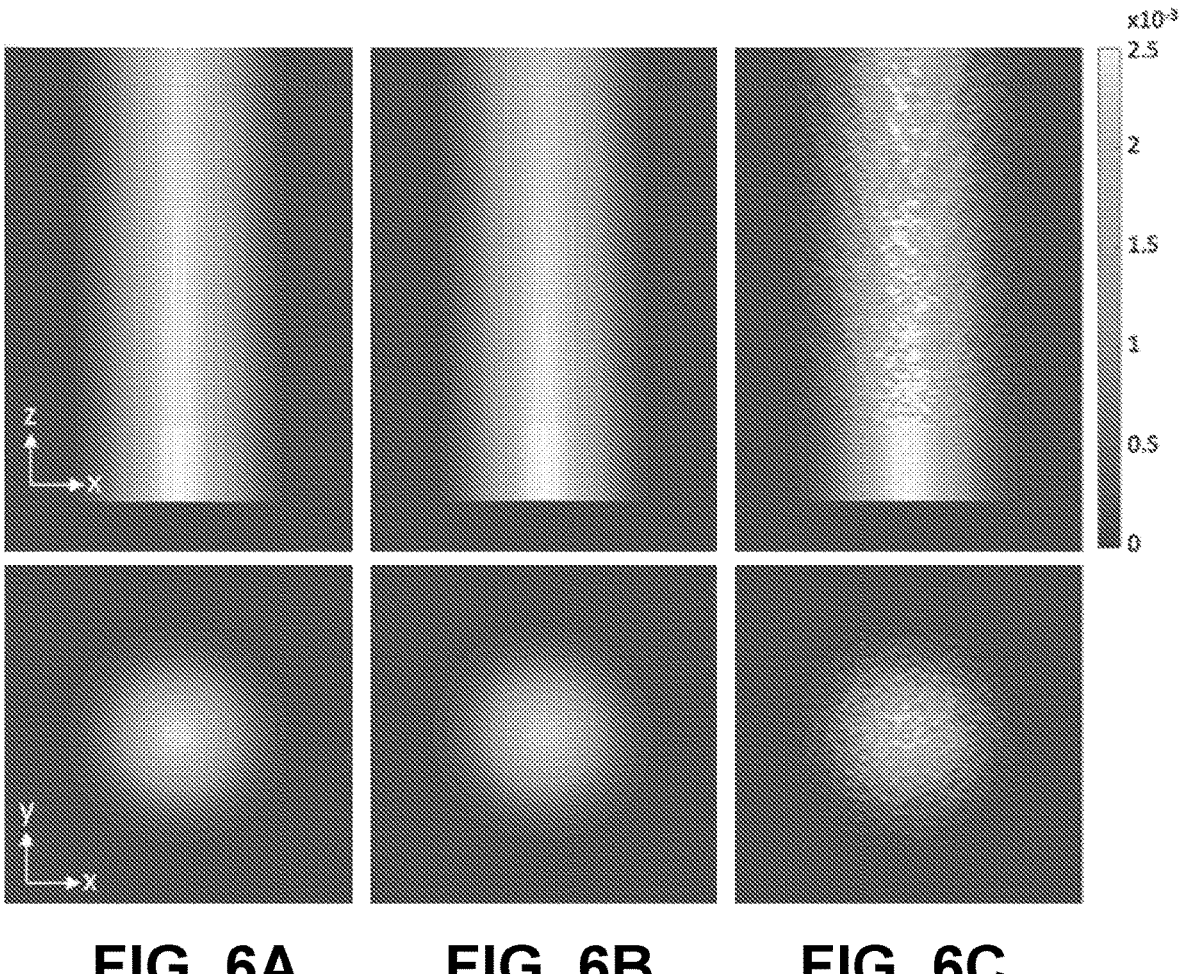
FIG. 6A illustrates a FDTD simulation of hydrogel ink without additives, according to some embodiments.
FIG. 6B illustrates a FDTD simulation of hydrogel ink with dissolved precursor salt, according to some embodiments.
FIG. 6C illustrates a FDTD simulation of hydrogel ink with $Fe_3O_4$ nanoparticles added prior to printing, according to some embodiments.

FIG. 6A illustrates a finite difference time domain (FDTD) simulation of hydrogel ink without any precursor salt. FIG. 6B illustrates a FDTD simulation of hydrogel ink with dissolved precursor salt. FIG. 6C illustrates a FDTD simulation of hydrogel ink with $Fe_3O_4$ nanoparticles that were added prior to printing. The laser propagation is in the Z direction. The XY lateral cross-section shows the light intensity distribution at a 10-micrometer penetration depth. FIG. 6B and FIG. 6C show the major differences when nanoparticles are developed post-printing. When precursor salt is added to a printing solution, it can be dissolved. This adds pigment to the ink, which can reduce the penetration depth of a laser light without causing scattering. The reduction in light can be advantageous to the printing process as it assists in layer thickness control. When nanoparticles are added to the ink, as shown in FIG. 6C, evident scattering and depreciation of the laser beam are shown.

This is important because in the past hydrogel deployment has been limited by traditional processing methods such as molding for 3D geometries. For example, micro-molding requires templates. This is a major drawback as it hinders accelerated design/material development. Moreover, molding techniques only allow for a single material utilization. The limitation of conventional fabrication can be overcome by the recent advances in additive manufacturing, which enables the fabrication of complex three-dimensional and hybrid structures with enhanced functionality. The direct 3D printing of composite inks suffers from multiple drawbacks such as inhomogeneous particle distribution, agglomeration, and scattering of curing light in light-based 3D printing techniques, thus compromising the printed object quality and resolution. These drawbacks are shown in FIG. 6C.

Example 1

As an example, CuO, $Fe_3O_4$, and NiO nanoparticles were induced within PEGDA hydrogels by the incorporation of precursor salts. CuO nanoparticles may be induced by $Cu(NO_3)_2$ precursor salt. $Fe_3O_4$ nanoparticles may be induced by $Fe(NO_3)_3$, $FeCl_3$, $FeCl_2$, $Fe_2SO_4$, and $FeSO_4$ precursor salts. NiO nanoparticles may be induced by $NiSO_4$ precursor salt. The nanoparticles were developed post-printing by a chemical reduction process using a base. In this example, NaOH was utilized as the base. NaOH solution is used for the chemical reduction process. While NaOH was utilized, other reducing agents may be utilized. For example, $NH_4OH$, KOH, KCl, and $NaBH_4$ can also be utilized. The presence of nanoparticles within the hydrogels post-printing is confirmed by X-ray diffractometry (XRD) spectra.

Figure 7A:
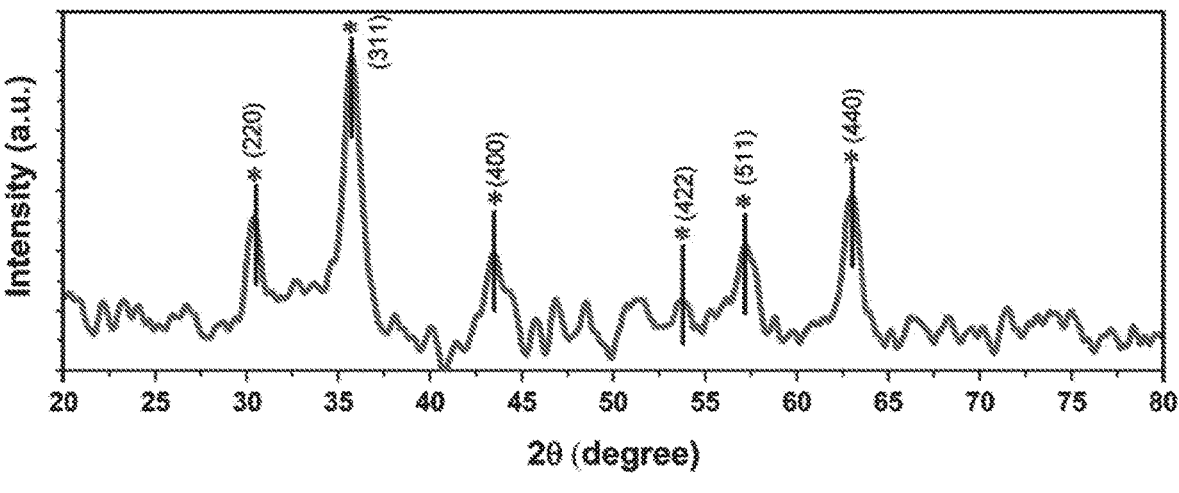
FIG. 7A illustrates an X-ray diffractometry (XRD) spectrum of $Fe_3O_4$ nanoparticles synthesized within poly(ethylene glycol) diacrylate (PEGDA) hydrogel, according to some embodiments.
Figure 7B:
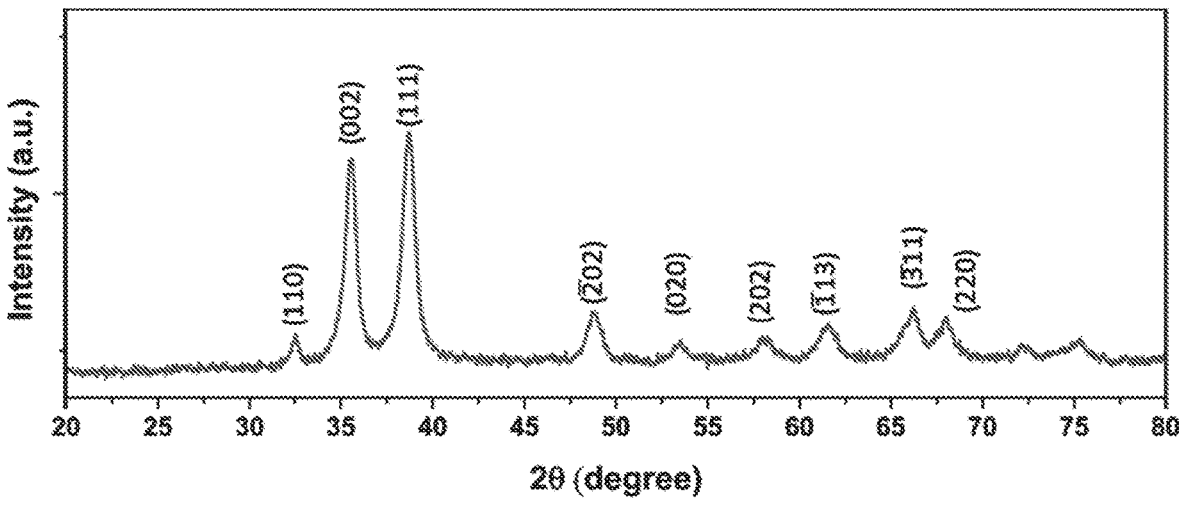
FIG. 7B illustrates an XRD spectrum of CuO nanoparticles synthesized within poly(ethylene glycol) diacrylate (PEGDA) hydrogel, according to some embodiments.
Figure 7C:
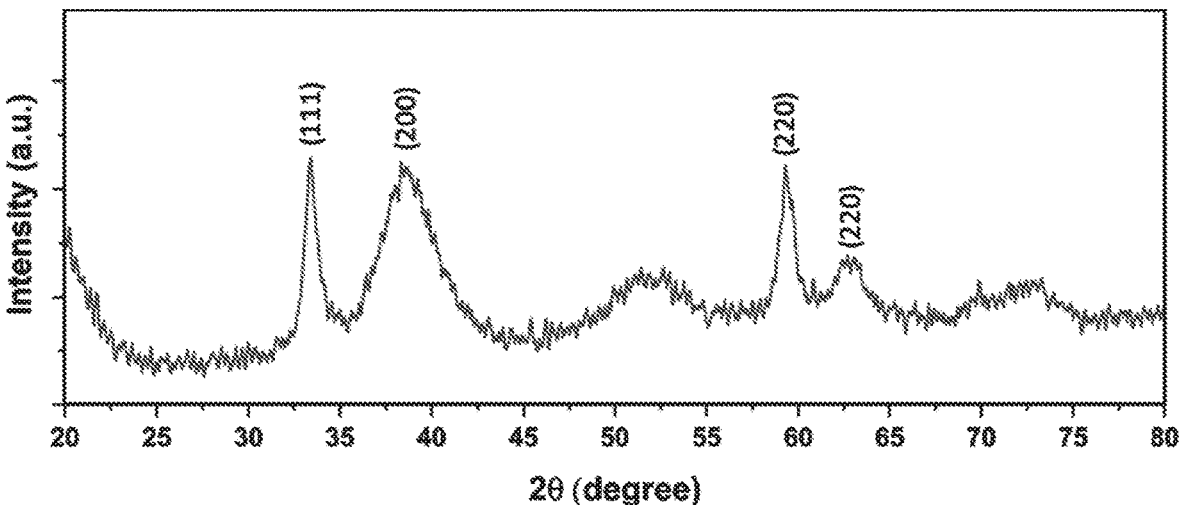
FIG. 7C illustrates an XRD spectrum of NiO nanoparticles synthesized within poly(ethylene glycol) diacrylate (PEGDA) hydrogel, according to some embodiments.

FIG. 7A illustrates an XRD spectrum of $Fe_3O_4$ nanoparticles synthesized within poly(ethylene glycol) diacrylate (PEGDA) hydrogel. FIG. 7B illustrates an XRD spectrum of CuO nanoparticles synthesized within poly(ethylene glycol) diacrylate (PEGDA) hydrogel. FIG. 7C illustrates an XRD spectrum of NiO nanoparticles synthesized within poly (ethylene glycol) diacrylate (PEGDA) hydrogel.

Figure 8A:
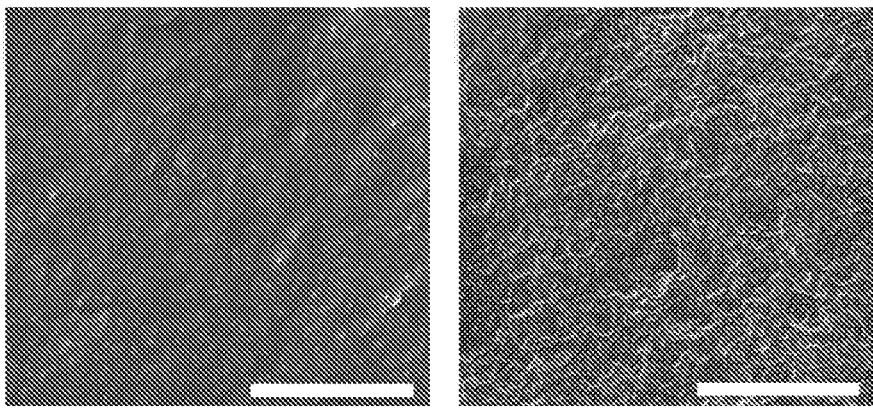
FIG. 8A illustrates SEM images of CuO hydrogel nanocomposites prepared with inks using precursor salts before and after chemical reduction, according to some embodiments.
Figure 8B:
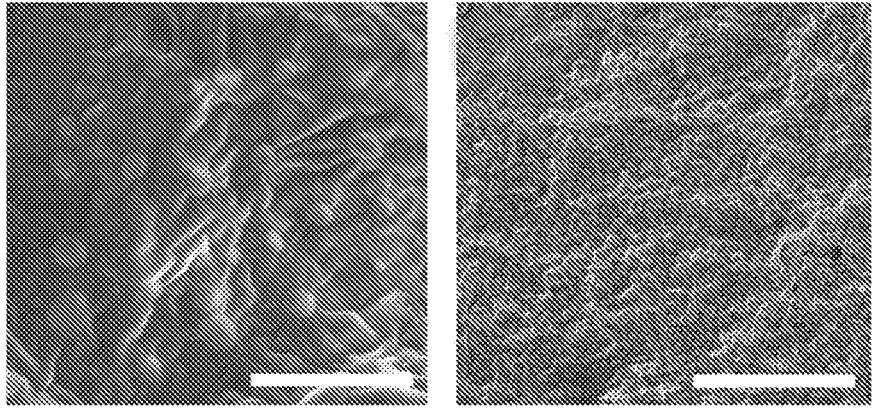
FIG. 8B illustrates SEM images of NiO hydrogel nanocomposites prepared with inks using precursor salts before and after chemical reduction, according to some embodiments.

SEM imaging was completed for hydrogel nanocomposites prepared using inks with precursor salts. FIG. 8A illustrates SEM images of CuO hydrogel nanocomposites prepared with inks using precursor salts before and after chemical reduction. FIG. 8B illustrates SEM images of NiO hydrogel nanocomposites prepared with inks using precursor salts before and after chemical reduction.

Example 2

A layer-by-layer additive manufacturing approach can fabricate multi-component devices with manifold materials—thereby producing hybrid structures. However, this also introduces complexity to the printing process, particularly when dealing with nanoparticle-based printing ink. The 3D printing of composite inks presents multiple challenges such as inhomogeneous particle distribution, agglomeration, and scattering of curing light which compromises the printed object quality and resolution. To solve this issue, an additively fabricated anisotropic hybrid 3D structure can be a photocurable thermoresponsive p(NIPAm-co-PEGDA) (NPH) hydrogel on top of PEGDA foam for solar vapor generation (SVG). The p(NIPAm-co-PEGDA) includes photocurable poly(N-isopropylacrylamide) and PEGDA. The in-situ post-printing synthesis of iron oxide nanoparticles within the p(NIPAm-co-PEGDA) hydrogel on the top surface, thus introducing anisotropy, is achieved by adding metallic salt precursor into the printing solution.

The fabricated hydrogel composite structure exhibits superior light absorption properties and rapid capillary-driven water transport through a 3D-printed microchannel network within the hydrogel. As a result, the SVG device achieves an extraordinary water evaporation rate of 5.12 kg $m^{-2}$ $h^{-1}$ under one sun (1 kW $m^{-2}$). The intrinsic water activation states, in addition to wettability modulation with temperature increase within p(NIPAm-co-PEGDA) hydrogel, plays a critical role in reducing the equivalent vaporization enthalpy and shifting the vaporization to relatively lower temperatures. The proposed hybrid SVG device is feasible, portable, and highly efficient, promising great potential for grand water-energy nexus challenges.

Figures 9A, 9B, 9C:
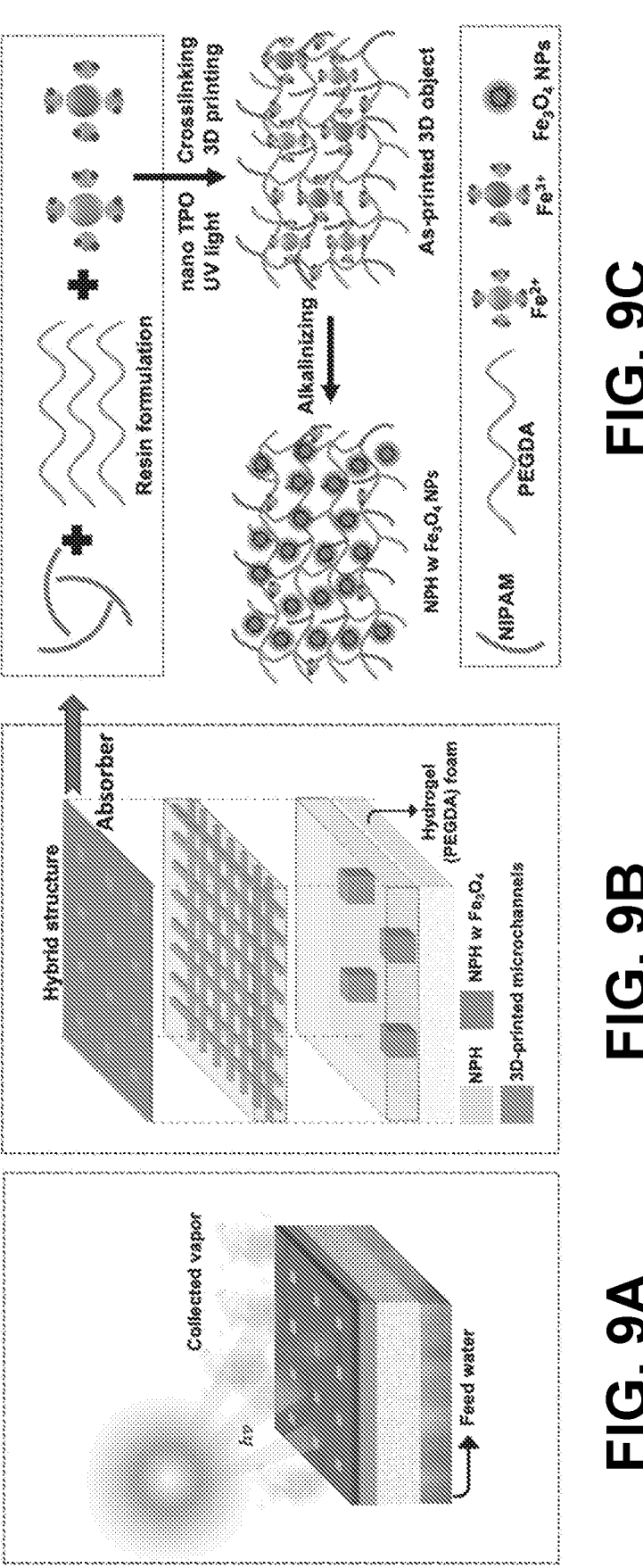
FIG. 9A illustrates a schematic of a solar vapor generation (SVG) device with a hybrid hydrogel structure, according to some embodiments.
FIG. 9B illustrates a hybrid structure and schematic of 3D printed microchannels in a SVG device, according to some embodiments.
FIG. 9C illustrates a schematic of the fabrication of a hydrogel with $Fe_3O_4$ nanoparticles formed post-printing, according to some embodiments.

FIG. 9A illustrates a schematic of an SVG device with a hybrid hydrogel structure. A hybrid/anisotropic hydrogel structure was developed from photocurable poly(N-isopropylacrylamide) and poly(ethylene glycol) diacrylate (p(NIPAm-co-PEGDA)) hydrogel-based printing ink. The PEGDA foam acts as a wicking material. This SVG device contains two main components: (i) 3D printed P(NIPAM-CO-PEGDA) anisotropic/hybrid structure consisting of top absorber surface with $Fe_3O_4$ nanoparticles for enhanced solar absorption while the base layers are embedded with interconnected microchannels printed using P(NIPAM-CO-PEGDA) without $Fe_3O_4$ nanoparticles; and (ii) Superhydrophilic PEGDA foam as a wick.

FIG. 9B illustrates a hybrid structure and schematic of 3D printed microchannels in an SVG device. FIG. 9B illustrates that micro-channels are printed within the p(NIPAm-co-PEGDA) structure to provide sufficient water supply through the crosslinked hydrogel to the top absorber surface containing $Fe_3O_4$ nanoparticles and prevent dry-out of the hydrogel.

Interconnected microchannels are printed on top of the PEGDA foam to ensure continuous water supply and replenishment to the hydrogel. The initial few layers of the base central channels with a width of (750 μm) may be printed slightly within the foam to ensure the adhesion of the 3D-printed hydrogel structure to the foam and ensuring the structural stability of the hybrid structure during the hydration process. This is connected to a mesh channel network with a width of 250 μm, which is extended to the absorber surface to create open evaporation and stress relieving sites when the hydrogel structure is shrinking and expanding. For comparison, a similar device was fabricated without any pores at the top absorber surface. After SVG experiments, the flat structure shows some cracks and delamination of top layer, because the stain mismatch stems from the dissimilar swelling ratio of the p(NIPAm-co-PEGDA) layers (with and without the $Fe_3O_4$) at varying hydration states. Moreover, the printing parameters are optimized to maintain the stability of the structure. While printing the device, lower energy exposure produces less crosslinked films with lower rigidity, thus higher stability under the cyclic partial dehydration and hydration (on and off illumination conditions correspondingly).

FIG. 9C illustrates a schematic of the fabrication of a hydrogel with $Fe_3O_4$ nanoparticles formed post-printing. FIG. 9C illustrates that metal salts are added into the printing ink for the topping layers as precursors to develop light-absorbing iron oxide nanoparticles ($Fe_3O_4$ nanoparticles) post-printing. Because of the superior light absorption properties and water activation within the hybrid p(NIPAm-co-PEGDA) hydrogel structure and the rapid and sufficient capillary-driven water through the 3D-printed microchannel network within the hydrogel, the fabricated SVG device achieves a remarkable water evaporation rate of 5.12 kg m$^{-2}$ h$^{-1}$ under one sun (1 kW m$^{-2}$) irradiation.

Figure 10A:
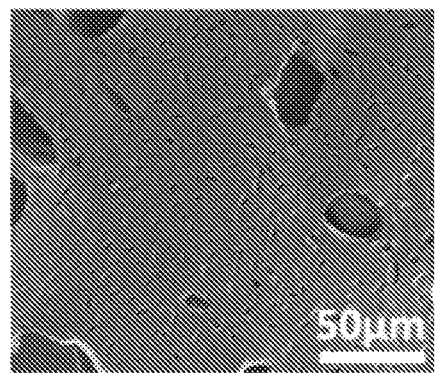
FIG. 10A illustrates low and high magnification SEM images of hydrogels without nanoparticles, according to some embodiments.
Figure 10A:
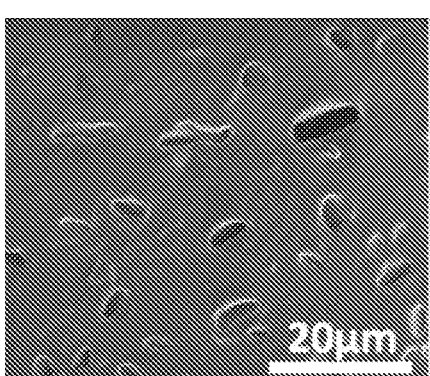

FIG. 10A illustrates low and high magnification SEM images of hydrogels without nanoparticles. To fabricate the p(NIPAm-co-PEGDA) hybrid structure via micro 3D printing, two ink formulations were prepared. The base formulation is a photo-curable/temperature-responsive p(NIPAm-co-PEGDA) hydrogel. Once crosslinked using the SLA-3D printing, a micro-sized porous surface is observed and elliptical pores having a diameter of 5±0.8 μm on their longitudinal axis, as seen in the SEM images in FIG. 10A.

Figure 10B:
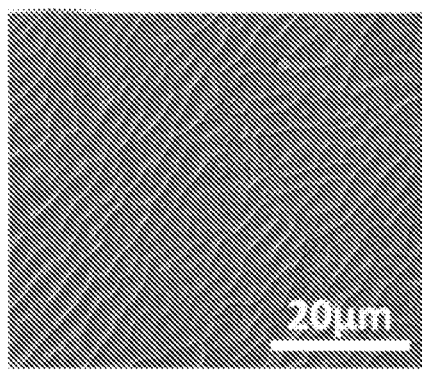
FIG. 10B illustrates low and high magnification SEM images of p(NIPAm-co-PEGDA) hydrogels with $Fe_3O_4$ nanoparticles formed post-printing, according to some embodiments.
Figure 10B:
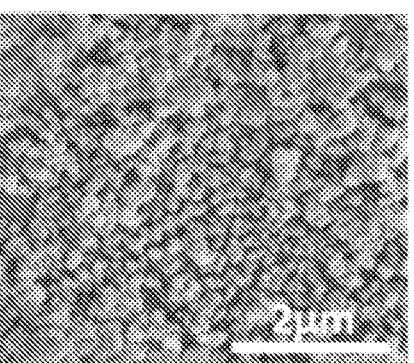

FIG. 10B illustrates low and high magnification SEM images of p(NIPAm-co-PEGDA) hydrogels with $Fe_3O_4$ nanoparticles formed post-printing. To incorporate $Fe_3O_4$ nanoparticles, the printing formulation is modified with precursor metal salts, $Fe(NO_3)_3$ and $FeCl_2$ (2:1), which is then used to print the top solar absorber surface. The as-printed hybrid structure (containing metal salt precursor only at the top surface) is developed post-printing process by the coprecipitation of $Fe^{3+}$ and $Fe^{2+}$ in alkaline conditions to yield $Fe_3O_4$ nanoparticles concentrated at the top surface. The resulting hydrogel is pitch-black in color reflecting the high solar absorption of the films. The $Fe_3O_4$ NP decorated p(NIPAm-co-PEGDA) top surface is densely packed with nanoparticles, as observed in the SEM image in FIG. 10B. The direct printing of nanocomposites with high filling factors of nanoparticles is difficult in light-based 3D printing techniques because they cause scattering of the laser light. Moreover, the nanoparticles in direct printing using nanoparticles are developed in the entirety of the hydrogel (surface and bulk).

Figure 10C:
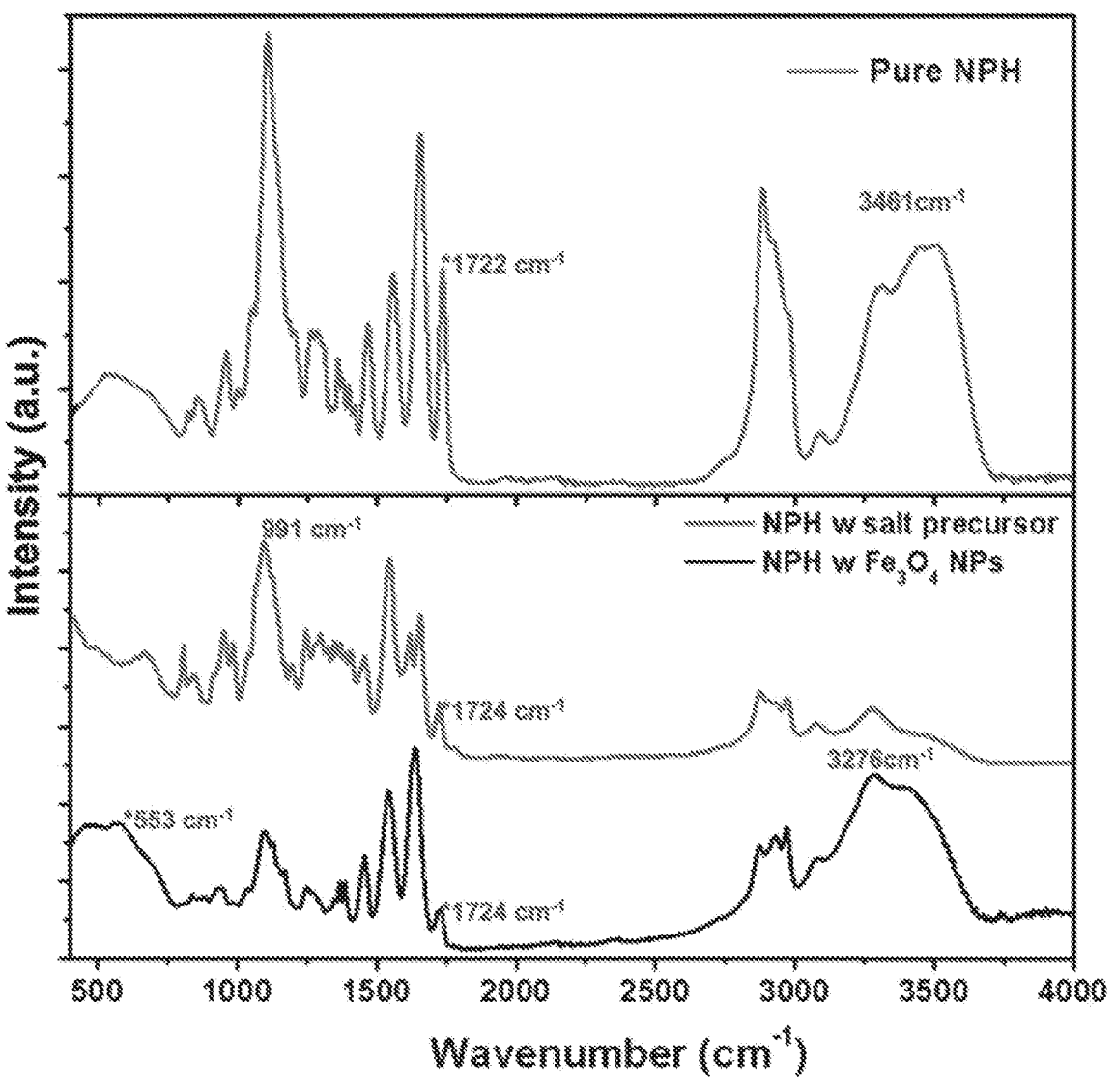
FIG. 10C illustrates Fourier transform infrared (FTIR) of hydrogels without nanoparticles, hydrogels with iron oxide precursor salts prior to printing, and hydrogels with synthesized $Fe_3O_4$ nanoparticles formed post-printing, according to some embodiments.

FIG. 10C illustrates Fourier transform infrared (FTIR) of hydrogels without nanoparticles, hydrogels with iron oxide precursor salts prior to printing, and hydrogels with synthesized $Fe_3O_4$ nanoparticles formed post-printing. The presence of the $Fe_3O_4$ nanoparticles is confirmed by the appearance of an absorption band at 553 cm$^{-1}$ and the peaks within 1050-991 cm$^{-1}$, which is linked to Fe—O—H stretching vibration. All the characteristic peaks confirm the copolymerization of NIPAM and PEGDA and the formation of $Fe_3O_4$ nanoparticles after alkalinization treatment.

Figure 10D:
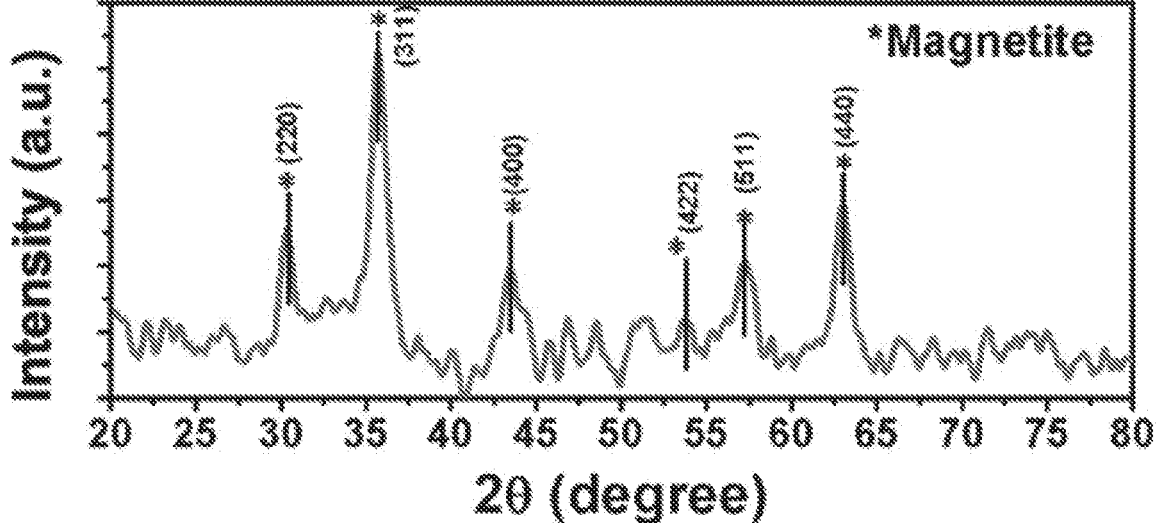
FIG. 10D illustrates XRD spectrum of synthesized $Fe_3O_4$ nanoparticles, according to some embodiments.

FIG. 10D illustrates XRD spectrum of synthesized $Fe_3O_4$ nanoparticles. The X-ray diffraction pattern for the pure $Fe_3O_4$ nanoparticles synthesized in solution is identified as the magnetite phase, as depicted in FIG. 10D.

Figure 11A:
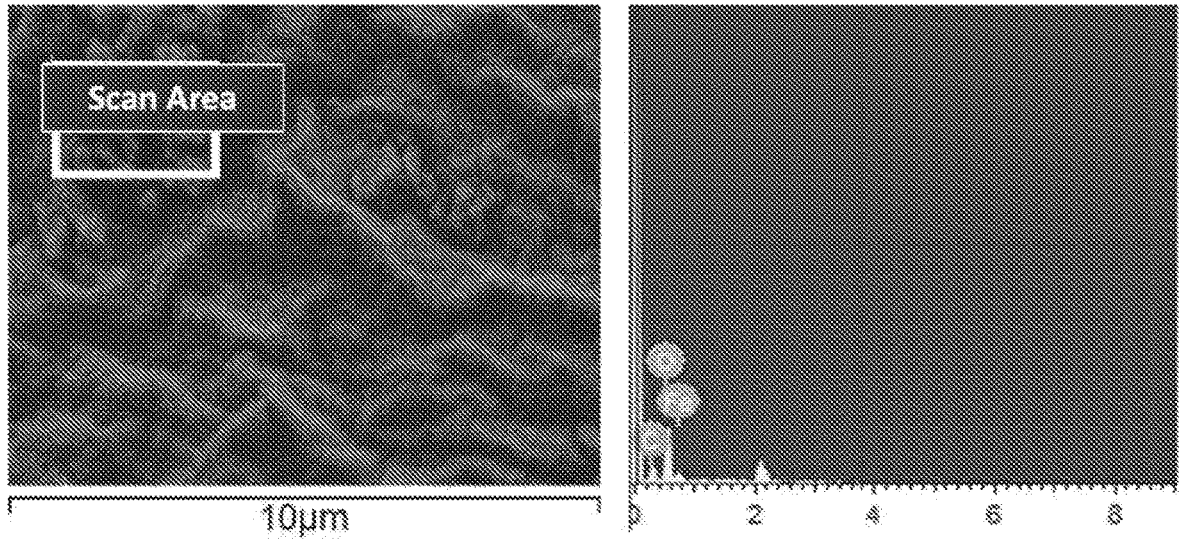
FIG. 11A illustrates EDS mapping of the cross-sectional area of a p(NIPAm-co-PEGDA) (NPH) hydrogel decorated with $Fe_3O_4$ nanoparticles, showing the homogeneous growth of the nanoparticles within the hydrogel film, according to some embodiments.

FIG. 11A illustrates EDS mapping of the cross-sectional area of a p(NIPAm-co-PEGDA) hydrogel decorated with $Fe_3O_4$ nanoparticles, showing the homogeneous growth of the nanoparticles within the hydrogel film.

Figure 11B:
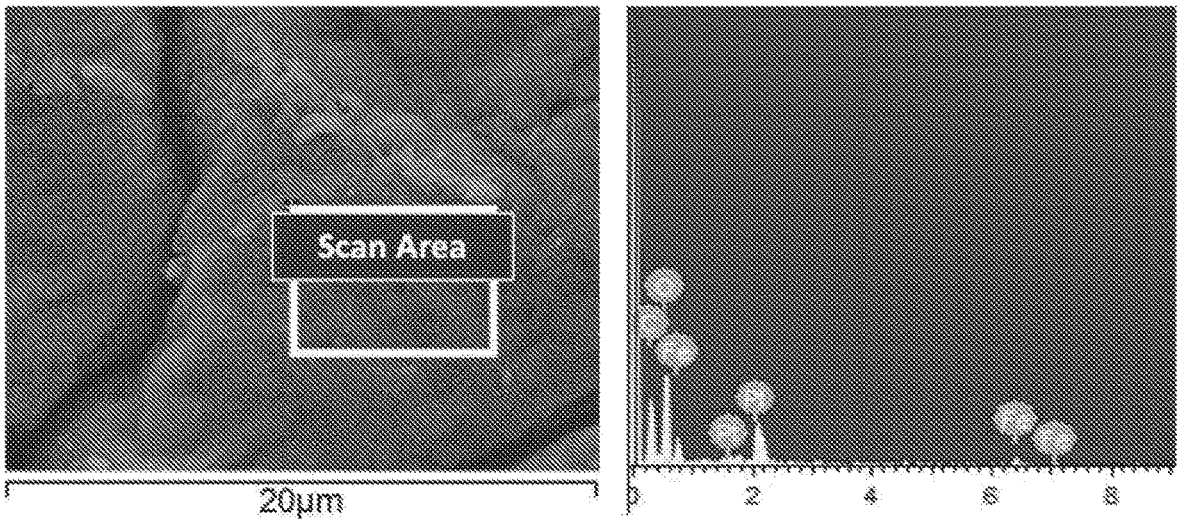
FIG. 11B illustrates EDS mapping of the top surface of P(NIPAM-co-PEGDA) hydrogel decorated with $Fe_3O_4$ nanoparticles, showing the homogeneous growth of the nanoparticles within the hydrogel film, according to some embodiments.

FIG. 11B illustrates EDS mapping of the top surface of p(NIPAm-co-PEGDA) hydrogel decorated with $Fe_3O_4$ nanoparticles, showing the homogeneous growth of the nanoparticles within the hydrogel film. The incorporation of salt as a precursor to synthesize nanoparticles is a successful strategy to avoid 3D printing with particles-based composite inks. This eliminates the light scattering during the printing as it compromises the printing features resolution due to particle aggregation and particles settling down in the ink, as well as inhomogeneous polymerization.

Figure 12A:
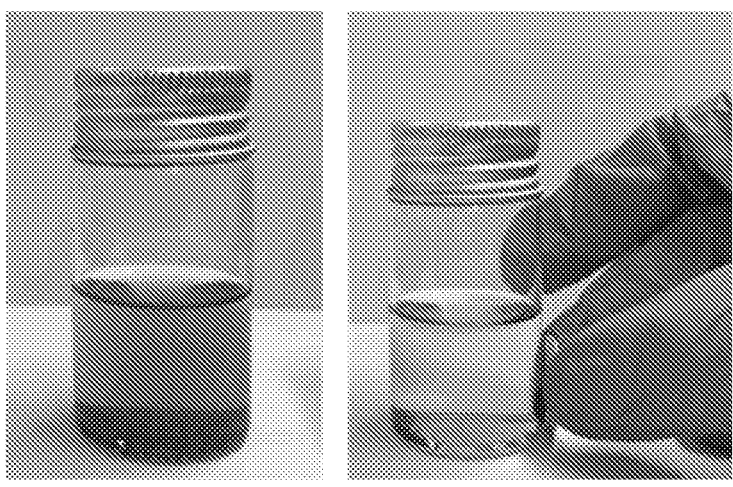
FIG. 12A illustrates the magnetism of synthesized pure $Fe_3O_4$ nanoparticles prepared in solution and dispersed in ethanol, according to some embodiments.
Figure 12B:
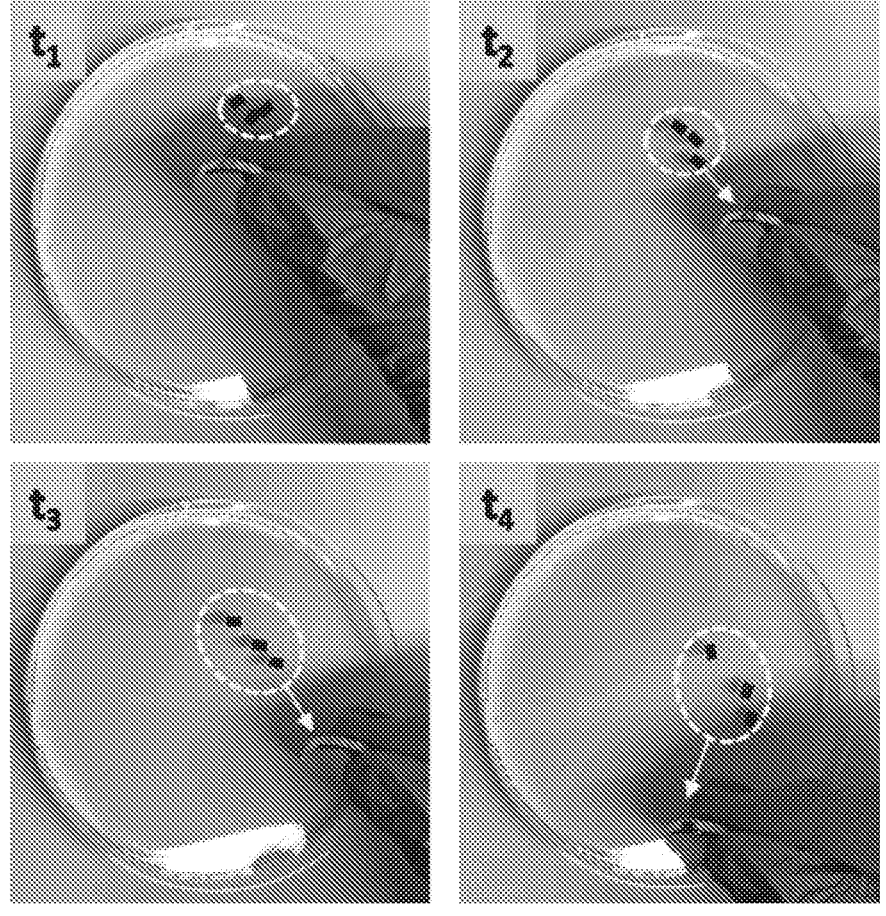
FIG. 12B illustrates the magnetism developed within the p(NIPAm-co-PEGDA) hydrogel due to the presence of the developed $Fe_3O_4$ nanoparticles, according to some embodiments.

FIG. 12A illustrates the magnetism of synthesized pure $Fe_3O_4$ nanoparticles prepared in solution and dispersed in ethanol. FIG. 12B illustrates the magnetism developed within the p(NIPAm-co-PEGDA) hydrogel due to the presence of the developed $Fe_3O_4$ nanoparticles. Magnetite and maghemite phases are difficult to distinguish from one another in XRD due to their similar cubic structure and close lattice parameters. The magnetite phase is identified due to the absence of the peaks located at 23.77° (210) and 26.10° (211), usually present in the XRD spectrum of the maghemite phase. Moreover, the magnetite phase is recognized by the dark black color of the nanoparticle and p(NIPAm-co-PEGDA) films.

Figure 13A:
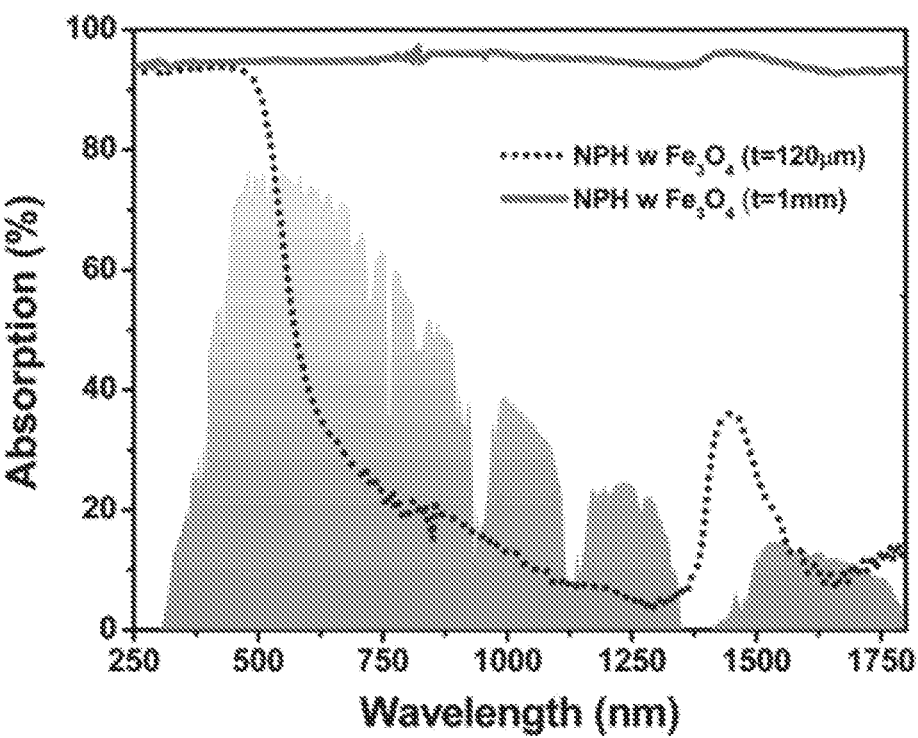
FIG. 13A illustrates measured UV-Vis-NIR absorption spectra of p(NIPAm-co-PEGDA) hydrogel with $Fe_3O_4$ nanoparticles formed post-printing for film thicknesses of 120 μm and 1 mm, according to some embodiments.
Figure 13B:
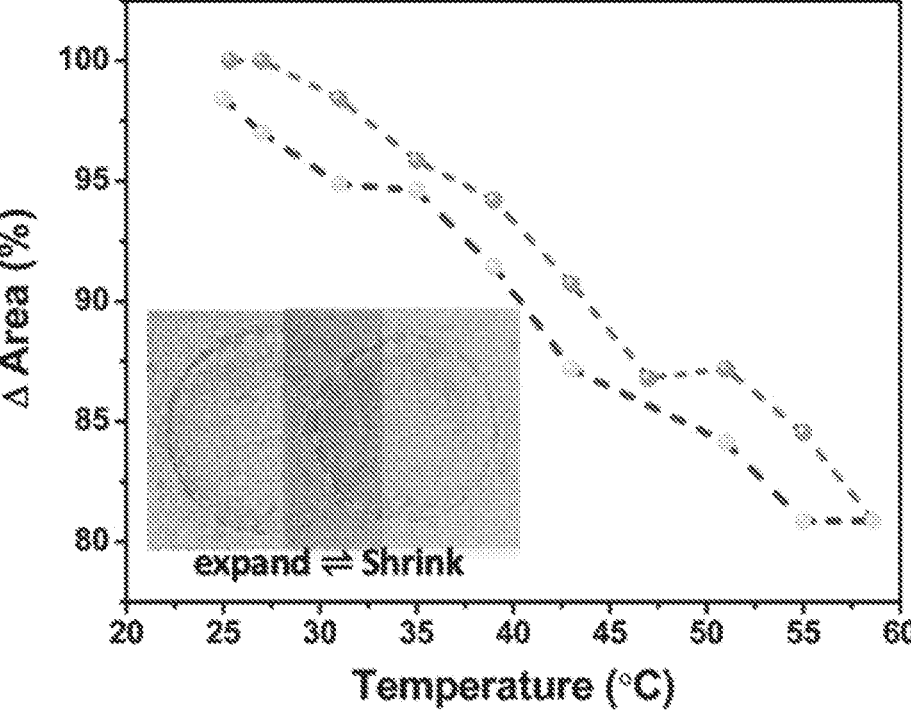
FIG. 13B illustrates the temperature response of the 3D-printed p(NIPAm-co-PEGDA) hydrogel disk captured with an optical microscope as the water surrounding the hydrogel is heated and cooled, according to some embodiments.

FIG. 13A illustrates measured UV-Vis-NIR absorption spectra of p(NIPAm-co-PEGDA) (NPH) hydrogel with $Fe_3O_4$ nanoparticles formed post-printing for film thicknesses of 120 μm and 1 mm. FIG. 13B illustrates the temperature response of the 3D-printed p(NIPAm-co-PEGDA) hydrogel disk captured with an optical microscope as the water surrounding the hydrogel is heated and cooled. The prime objective of choosing p(NIPAm-co-PEGDA) material for SVG is the tunable water content and transport rate for adequate water supply from the feed to evaporator surface. In addition, the intrinsic thermo-responsive behavior of p-NIPAM and dual wettability at higher temperature facilities the vapor release to the ambient. The temperature increase in the hydrogel is enabled by the excellent photo-thermal conversion of printed hydrogel films with $Fe_3O_4$ nanoparticles as illustrated in FIG. 13A. The as-developed p(NIPAm-co-PEGDA) films with $Fe_3O_4$ nanoparticles with a thickness of 120 μm shows spectrally selective light absorption characteristics, while the broad-band absorption is achieved by increasing the film thickness, with a solar absorption of (~94%), as depicted in FIG. 13A.

The swelling properties and hydrophilicity of p-NIPAM undergo a transition at a lower critical solution temperature (LCST) of 32° C. This transition stems from the interaction of the hydrophilic (amide —CONH—) and hydrophobic (isopropyl —CH(CH$_3$)$_2$) groups in the polymer with the solvent molecules. At temperature below the LCST, hydrogen bonds are formed between the hydrophilic groups in the polymer and water molecules. Once the temperature is increased beyond the LCST, the hydrophobic interaction overcomes the hydrophilic ones, leading to a coil-to-globule conformational transition whereby the polymer molecules aggregate while resulting in the volume shrinking and water expulsion from the polymer. The swelling properties and temperature-dependent transition behavior of p-NIPAM can be tailored by changing the crosslinker and thereby the hydrophilic-hydrophobic balance of polymer networks. The addition of PEGDA as a hydrophilic crosslinker of P-NIPAm changes the swelling properties. For the p(NIPAm-co-PEGDA) hydrogel synthesized, the temperature response is monitored by observing 3D-printed disks under the optical microscope while undergoing a heating-cooling cycle, as illustrated in FIG. 13B. Unlike the earlier study (Son et al., 2020), which identified a specific LCST between (34.0 to 41.4° C.) depending on NIPAM:PEGDA weight ratio and molecular weight of PEGDA, the shrinking of this hydrogel is seen to be gradual with heating. When the gel is heated to 58.5° C., a reversible shrinkage is observed in the cross-sectional area of the disk by ~20%.

Figure 13C:
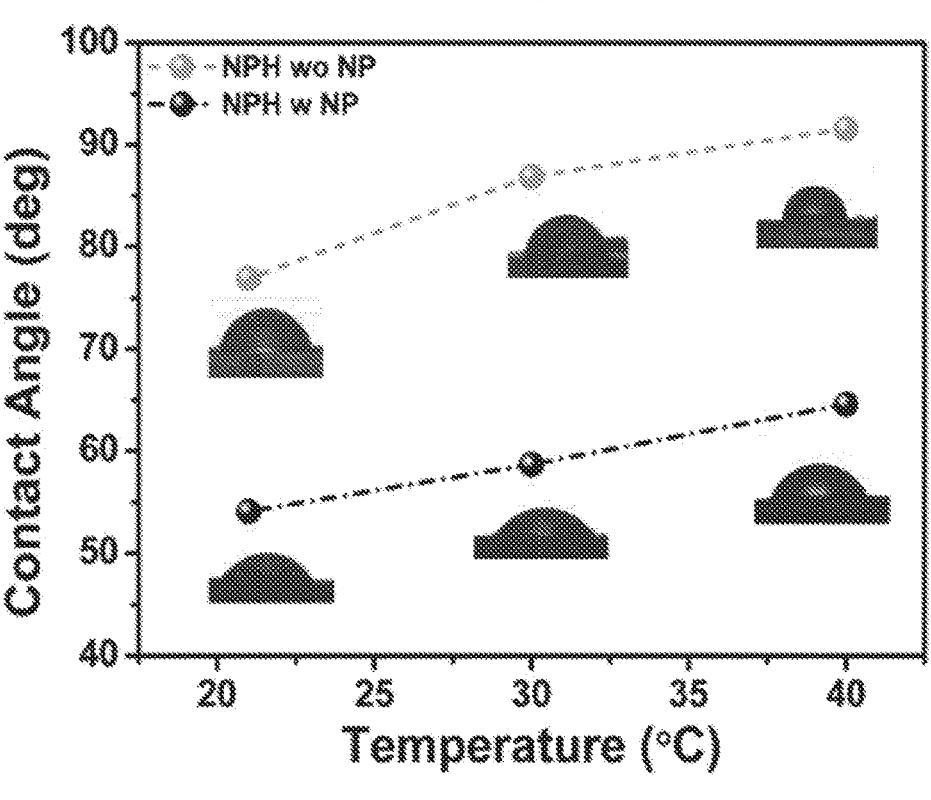
FIG. 13C illustrates the instantaneous contact angle measurement for p(NIPAm-co-PEGDA) with and without $Fe_3O_4$ nanoparticles showing the wettability alteration as the temperature increases, according to some embodiments.

FIG. 13C illustrates the instantaneous contact angle measurement for p(NIPAm-co-PEGDA) (NPH) with and without $Fe_3O_4$ nanoparticles (NP) showing the wettability alteration as the temperature increases. The contact angle was seen to gradually increase with temperature, indicating the gradual transition in the wettability of p(NIPAm-co-PEGDA) hydrogel from the hydrophilicity towards hydrophobicity, as shown in FIG. 13C. It is consistent with the observation of volume change in FIG. 13B, where no abrupt change in wettability is observed at a specific temperature, unlike the previously reported NIPAM crosslinked with N,N-methylenebisacrylamide (BIS). The contact angle of the pure p(NIPAm-co-PEGDA) goes from 76.9 to 91.6 degrees as the temperature of the p(NIPAm-co-PEGDA) films increases from 21° C. to 40° C., while the contact angle of the $Fe_3O_4$-modified p(NIPAm-co-PEGDA) increases from 54.1 to 64.6 degrees under the same temperature rise. Due to the hydrophilic nature of nanoparticles, the contact angles of the films modified with $Fe_3O_4$ are lower. The gradual/mild change in hydrophilicity is pivotal to continuous operation of the SVG device, which is enabled by the hydrophilic PEGDA crosslinker. Otherwise, if the P(NIPAm) has a defined temperature for sharp wettability switching within the operation regime of the SVG, the hydration state of the hydrogel would be disrupted and the evaporation rate would be disturbed, and continuous vapor generation would not be guaranteed.

Figure 13D:
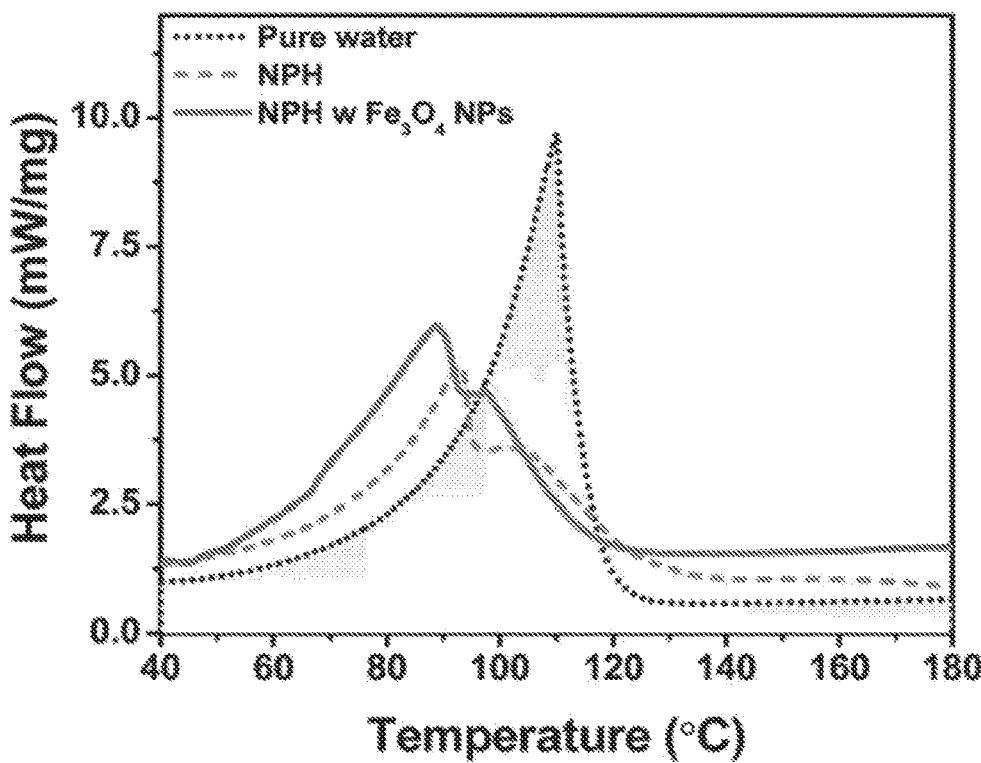
FIG. 13D illustrates DSC heat flow signals of pure water and p(NIPAm-co-PEGDA) hydrogel with and without $Fe_3O_4$ nanoparticles, according to some embodiments.

FIG. 13D illustrates DSC heat flow signals of pure water and p(NIPAm-co-PEGDA) (NPH) hydrogel with and without $Fe_3O_4$ nanoparticles. For pure water, the signal increases until it peaks around 100° C. then rapidly decays beyond that. The evaporation enthalpy of pure water was found to be 2489.3 J/g, which is close to the theoretical value of 2443 J/g, indicating the accuracy of the measurement. For p(NIPAm-co-PEGDA), the heat flow signal is broader and flatter in comparison with water and spans over a wider temperature range starting from a lower temperature, indicating a gradual evaporation process. The results suggested a ~60% reduction in energy required for vaporization when compared to standard free water. The addition of the $Fe_3O_4$ nanoparticles in the p(NIPAm-co-PEGDA) yields a slightly higher enthalpy of vaporization (1679.5 J/g) than that for p(NIPAm-co-PEGDA) without $Fe_3O_4$ nanoparticles (1473.2 J/g), while the peak is shifted to a lower temperature. This is attributed to the reduced porosity of the film when the $Fe_3O_4$ nanoparticles are developed. A shoulder peak is observed in the vaporization of water with p(NIPAm-co-PEGDA)-based hydrogels, indicating the presence of different states of water.

Figure 14:
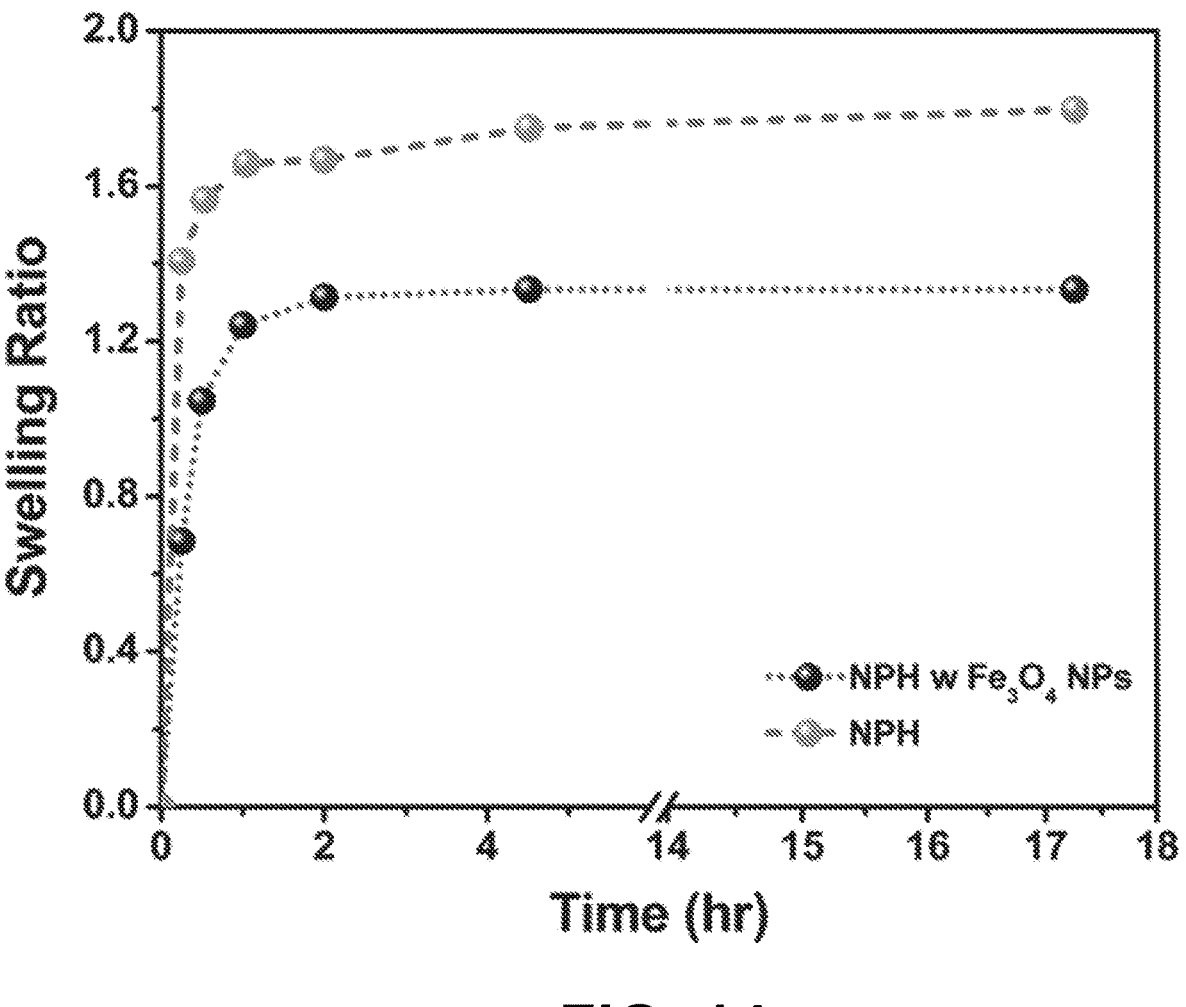
FIG. 14 illustrates the swelling kinetics of p(NIPAm-co-PEGDA) and p(NIPAm-co-PEGDA) with $Fe_3O_4$ nanoparticles, according to some embodiments.

FIG. 14 illustrates the swelling kinetics of p(NIPAm-co-PEGDA) (NPH) and p(NIPAm-co-PEGDA) (NPH) with $Fe_3O_4$ nanoparticles. The swelling behaviors of the p(NIPAm-co-PEGDA) hydrogels presented in FIG. 14 facilitate the water evaporation when the temperature of the absorber is increased.

Figure 15:
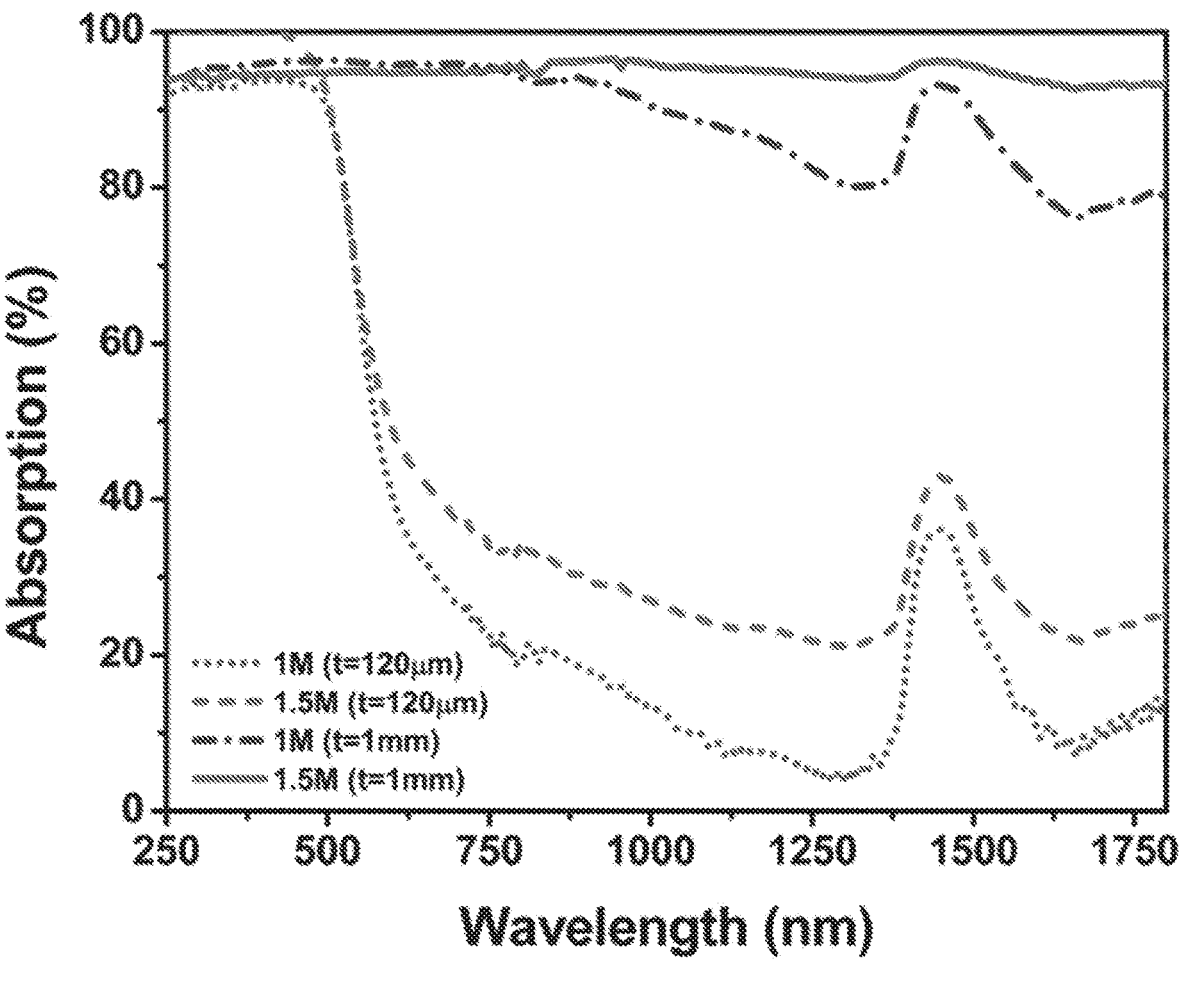
FIG. 15 illustrates measured UV-Vis-NIR Absorption spectra of p(NIPAm-co-PEGDA) hydrogel with $Fe_3O_4$ nanoparticles with film thicknesses of 120 μm and 1 mm for different precursor salt molar concentrations, according to some embodiments.

FIG. 15 illustrates measured UV-Vis-NIR Absorption spectra of p(NIPAm-co-PEGDA) hydrogel with $Fe_3O_4$ nanoparticles with film thicknesses of 120 μm and 1 mm for different precursor salt molar concentrations. The molar concentration of the salt as a nanoparticle precursor is optimized in the printing ink. The increase in the concentration of the nanoparticles produced within the hydrogel in relation to the initial salt concentration within the printing ink can be indicated by the reduced transmission of the light. With the increase in salt concentration within the printing ink, the solar absorption of the p(NIPAm-co-PEGDA) also increases, indicating the higher density of the $Fe_3O_4$ nanoparticles in the films after alkalinization. As a result, even the thin p(NIPAm-co-PEGDA) film can achieve superior light absorption, as shown in FIG. 15. However, the maximum molar concentration is limited by the solubility of the salt in the printing ink. As a result, 0.15 M of $FeCl_2$ and 0.3 M of $Fe(NO_3)_3$ salt concentrations are used. The fast and easy evaporation is also facilitated by the reduced enthalpy of vaporization of the water within the hydrogel network when compared to pure water.

An evaporation device is fabricated with p(NIPAm-co-PEGDA) hydrogels. The 3D printed structure is built on a hydrogel PEGDA foam acting as the wicking material. The open porous structure of the foam is created by the chemical reaction of acetic acid with sodium bicarbonate within the PEGDA 575 with 1.5 wt % of water-dispersible nano-TPO. A double displacement reaction occurs whereby the acetic acid reacts with sodium bicarbonate to form sodium acetate and carbonic acid. The carbonic acid undergoes a decomposition ratio to form carbon dioxide and water due to its instability.

Figure 16A:
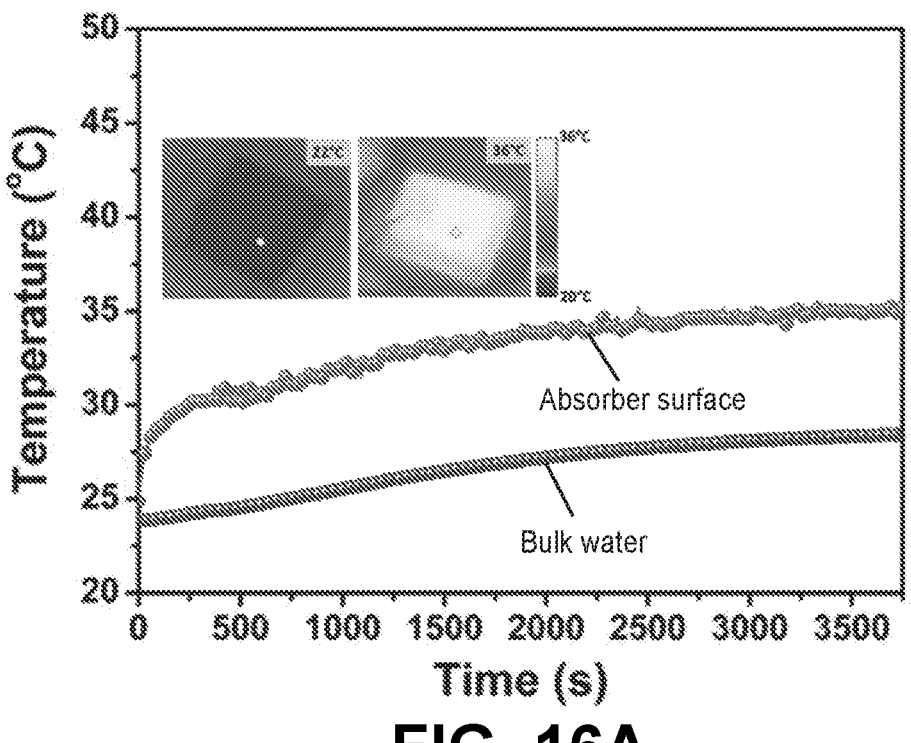
FIG. 16A illustrates the measured temperature of the top absorber surface and bulk water, and the corresponding infrared images showing the temperature distribution prior to irradiation and under steady state operation conditions, according to some embodiments.

FIG. 16A illustrates the measured temperature of the top absorber surface and bulk water, and the corresponding infrared images showing the temperature distribution prior to irradiation and under steady state operation conditions. The insets are the infrared images showing the temperature distribution of the top surface of the absorber prior to light exposure and under illumination, where the top absorber surface exhibits a homogenous temperature profile, as shown in FIG. 16A. As for the bulk water, its temperature increased slightly with time.

Figure 16B:
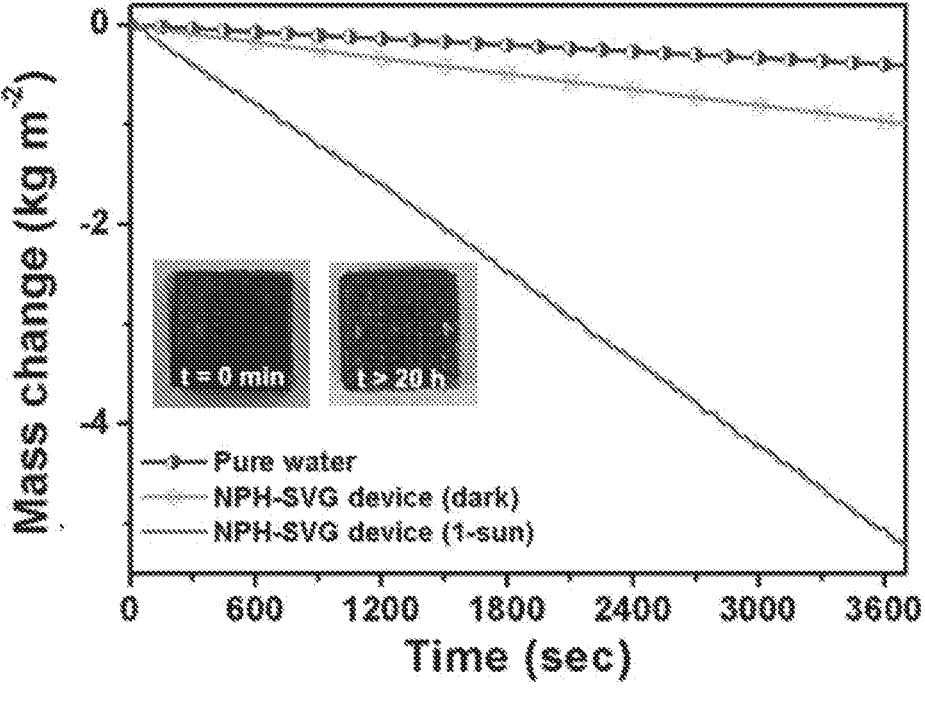
FIG. 16B illustrates the water mass loss of a 3D-printed p(NIPAm-co-PEGDA) hydrogel device under 1 sun and in the dark, referenced to dark bulk water evaporation. Inset images shows the top view of device before and after using the device for more than 20 hours, according to some embodiments.

FIG. 16B illustrates the water mass loss of a 3D-printed p(NIPAm-co-PEGDA) (NPH) hydrogel device under 1 sun and in the dark, referenced to dark bulk water evaporation. Inset images shows the top view of device before and after using the device for more than 20 hours.

Figure 16C:
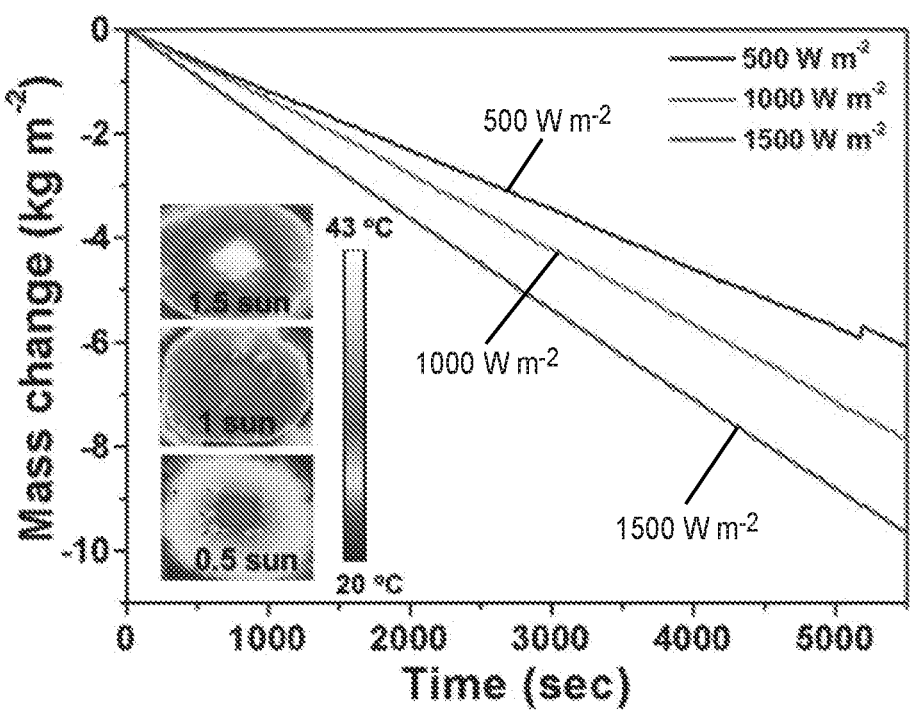
FIG. 16C illustrates the water mass loss of a 3D-printed p(NIPAm-co-PEGDA) hydrogel device under the irradiations of various sun intensities. Inset images show the corresponding infrared images of the temperature distribution at the top absorber surface, according to some embodiments.

FIG. 16C illustrates the water mass loss of a 3D-printed p(NIPAm-co-PEGDA) hydrogel device under the irradiations of various sun intensities. The inset images show the corresponding infrared images of the temperature distribution at the top absorber surface.

Experiments were performed under various intensities of solar irradiation and with the saline water (3.5 wt % $NaCl_{(aq)}$ solution). Consistent with the initial experimental results, the 3D-printed p(NIPAm-co-PEGDA) hydrogel device shows remarkable evaporation rates of 3.96, 5.12, and 6.48 kg m$^{-2}$ h$^{-1}$ under the simulated irradiation of solar intensities of 500, 1000, and 1500 W m$^{-2}$, respectively, as shown in FIG. 16C. The outstanding higher evaporation rate of 6.48 kg m$^{-2}$ h$^{-1}$ under 1.5-sun is attributed to the higher surface temperature of 42° C. of absorber surface, as shown in the inset infrared images. The surface temperature of initially fully hydrated 3D-printed p(NIPAm-co-PEGDA) hydrogel device was measured under 1-sun irradiation without water supply, where the device was covered with a polyethylene sheet to avoid convection heat losses from the top surface. The absorber surface temperature reaches 55° C. with vapor release on the cover. This shows the potential of operating the device under the irradiation intensity of greater than 1-sun to boost the surface temperature with much higher evaporation rate.

Figure 16D:
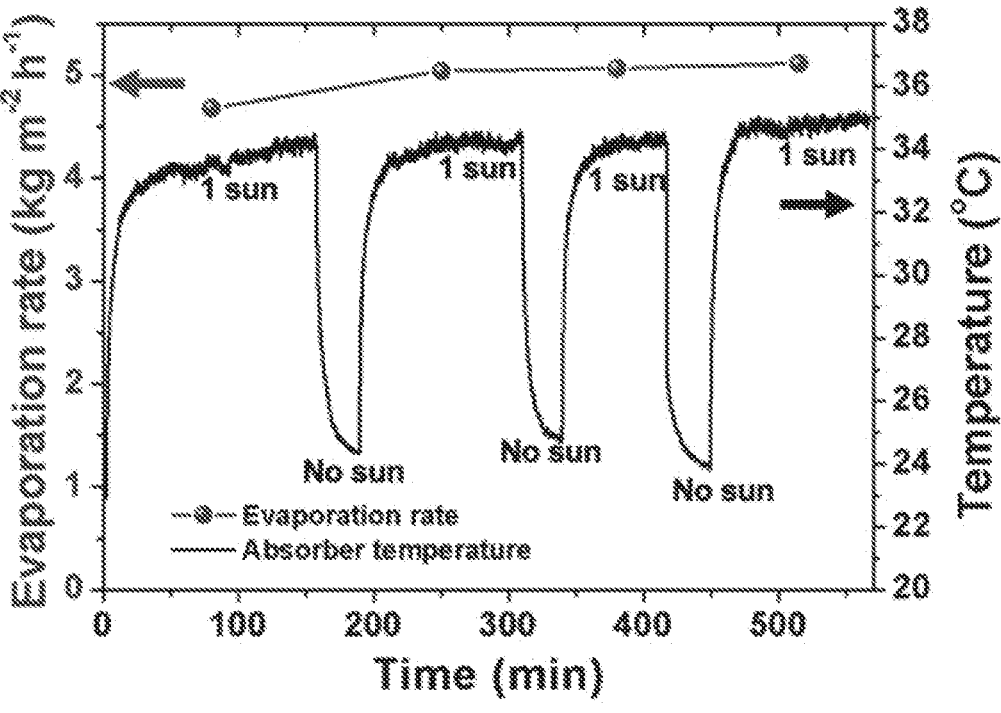
FIG. 16D illustrates a performance stability experiment of the 3D-printed p(NIPAm-co-PEGDA) hydrogel device showing the measured evaporation rates and temperature of the top absorber surface under cyclic on-off 1-sun irradiation, according to some embodiments.

FIG. 16D illustrates a performance stability experiment of the 3D-printed p(NIPAm-co-PEGDA) hydrogel device showing the measured evaporation rates and temperature of the top absorber surface under cyclic on-off 1-sun irradiation. For the stability test, the same device was used to measure the evaporation rates by cyclic irradiation under 1 sun. As shown in FIG. 16D, in each cycle, the 3D-printed p(NIPAm-co-PEGDA) hydrogel device was able to maintain a stable evaporation rate. Besides fresh water, a 3.5 wt % aqueous solution of NaCl was used to demonstrate the solar desalination potential of 3D-printed p(NIPAm-co-PEGDA) hydrogel device.

Figure 16E:
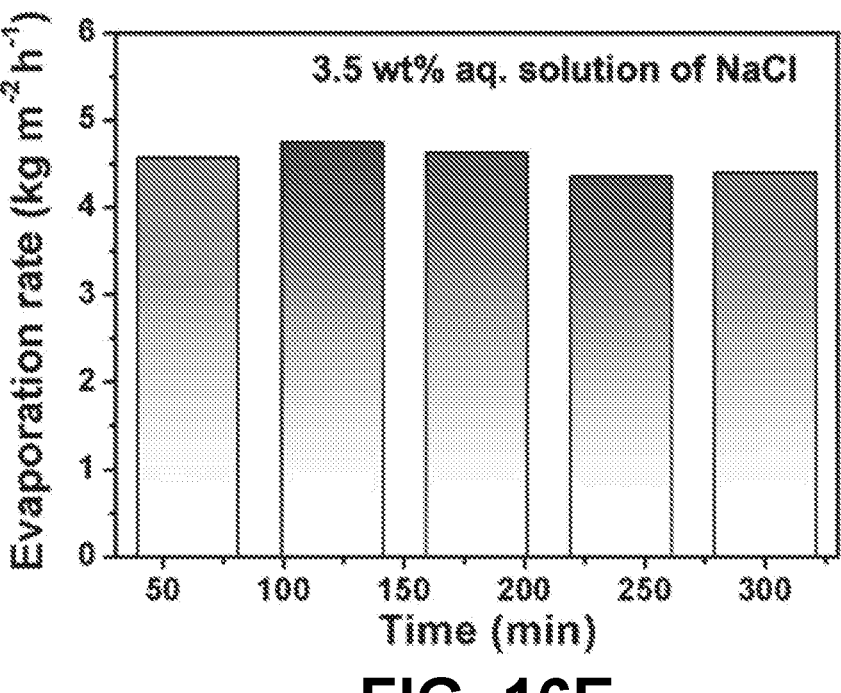
FIG. 16E illustrates a stable evaporation rate of 3.5 wt % NaCl aqueous solution using a 3D-printed p(NIP Am-co-PEGDA) hydrogel device, according to some embodiments.

FIG. 16E illustrates a stable evaporation rate of 3.5 wt % NaCl aqueous solution using a 3D-printed p(NIPAm-co-PEGDA) hydrogel device. For continuous operation of 7 hours, the 3D-printed p(NIPAm-co-PEGDA) hydrogel device maintained the stable evaporation rate, as shown in FIG. 16E, without considerable salt precipitation at the absorber surface. The intrinsic porosity of p(NIPAm-co-PEGDA) hydrogel and the 3D printed interconnected porous network particularly helped water to efficiently propagate to the top absorber surface. This helped to maintain the stable evaporation performance for an extended period and minimized the possibility of dry out to avoid any salt nucleation.

Figure 16F:
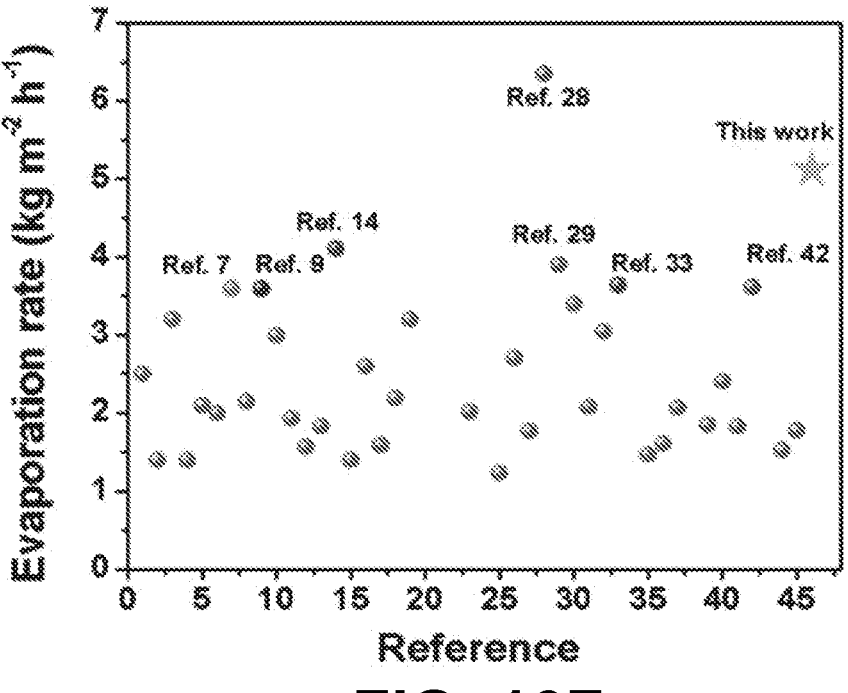
FIG. 16F illustrates evaporation rate performance comparison of the p(NIPAm-co-PEGDA) hybrid device compared to other SVG devices under one sun irradiation, according to some embodiments.

FIG. 16F illustrates evaporation rate performance comparison of the p(NIPAm-co-PEGDA) hybrid device compared to other SVG devices under one sun irradiation. The p(NIPAm-co-PEGDA) shows outstanding performance when compared to previously reported hydrogel-based materials, thus promising remarkable potential for freshwater production and desalination.

Figure 17:
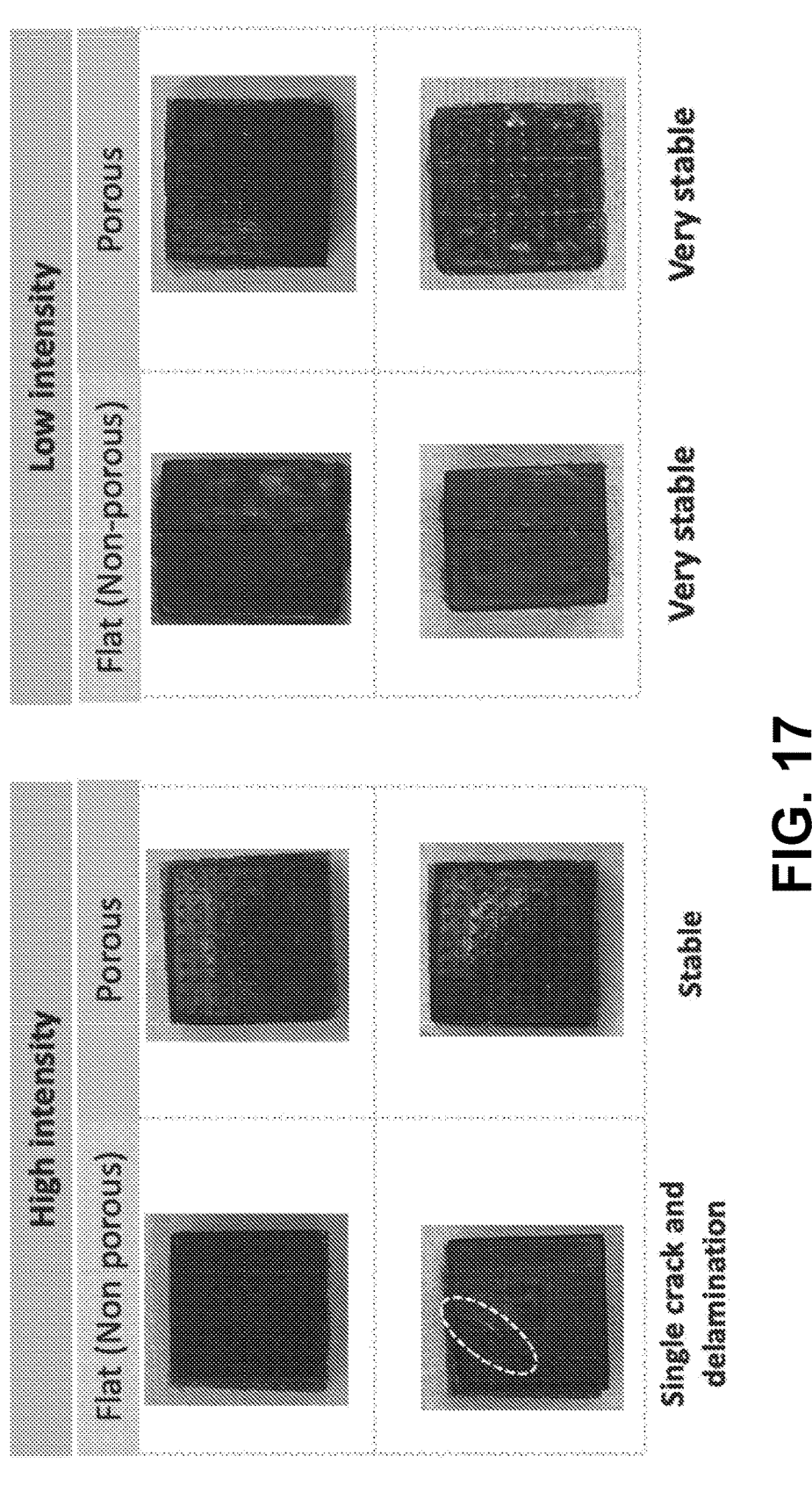
FIG. 17 illustrates pictures of a 3D printed p(NIPAm-co-PEGDA) SVG device, with and without top surface pores (flat non-porous and porous), to evaluate their importance in the structural integrity of the device under continuous operation condition, according to some embodiments.

FIG. 17 illustrates pictures of a 3D printed p(NIPAm-co-PEGDA) SVG device, with and without top surface pores (flat non-porous and porous), to evaluate the importance in the structural integrity of the device under continuous operation condition.

Highly efficient solar-driven water vapor generation was achieved by temperature responsive p(NIPAm-co-PEGDA) hydrogel with a gradual modulation of hydrogel wettability with temperature. The hydrogel offers intrinsic water activation, which reduces the energy required for evaporation, with the additional benefit of reducing the temperature required for evaporation. 3D printing enables the fabrication of a hybrid SVG device, composed of super hydrophilic PEGDA foam with ultra-high dry-out heat flux and strong water wickability, in combination with a 3D printed microchannel network to effectively supply water to the p(NIPAm-co-PEGDA) hydrogel. Nonetheless, 3D printing of a solar absorber using a hydrogel ink with precursor salts facilitates the post-printing development of the $Fe_3O_4$ nanoparticles and creates the nanostructure surface, which leads to heat localization of the absorber surface and water activation by further reducing the temperature required for evaporation. All of the above-mentioned characteristics yield a record-high stable solar vapor generation rate of 5.12 and 6.48 kg $m^{-2}$ $h^{-1}$ under 1 and 1.5 suns, respectively.

The photo-curable p(NIPAm-co-PEGDA) hydrogels were prepared by dissolving N-isopropylacrylamide) (NIPAm) as a monomer, poly(ethylene glycol) diacrylate (PEGDA) as a hydrophilic co-monomer and crosslinker, and water-dispersible nanoparticles of 2,4,6-trimethylbenzoyl-diphenylphosphine oxide (TPO) as a photoinitiator (PI), which initiates the photo-polymerization process upon light exposure. All were dissolved in pure water as a base solvent. Moreover, mordant orange dye was added to the hydrogel ink as a photo-absorber to control the penetration depth of light. Table 1 provides the chemical composition of the photo-curable hydrogel solutions.

For a p(NIPAm-co-PEGDA) hydrogel surface decorated with $Fe_3O_4$ nanoparticles, the precursor solution is modified by the addition of $Fe(NO_3)_3$ and $FeCl_2$ salt (2:1). The solution is vigorously stirred until the salt is fully dissolved in the hydrogel solution. The nanoparticles are synthesized after the curing/printing process by swelling the cured/printed solution in 10 wt % base solution of aqueous ammonium hydroxide ($NH_4OH$) to coprecipitate $Fe^{2+}$ and $Fe^{3+}$.

TABLE 1

Chemical composition of hydrogel precursor solution for the 3D printing. Water is used as a solvent for all solutions.

| Ink | NIPAAm (mM) | PEGDA 700 (mM) | PI (mM) | Mordant Orange (mM) | Iron chloride tetra-hydrate (M) | Fe(III) nitrate nona-hydrate (M) |
|---|---|---|---|---|---|---|
| p(NIPAm-co-PEGDA)[a] | 53.02 | 7.83 | 0.14 | 0.03 | — | — |
| p(NIPAm-co-PEGDA) w/ $Fe_3O_4$ Nano-particles[b] | 53.02 | 7.83 | 0.14 | — | 0.15 | 0.3 |

[a]The base of the hydrogel device;
[b]Solar absorbing hydrogel

TABLE 2

3D printing parameters of the hydrogel precursor solutions

| | Ink | Layer thickness (μm) | Exposure Intensity (mW · $cm^{-2}$) | Exposure time (s) | Energy dosage (J · $cm^{-2}$) |
|---|---|---|---|---|---|
| High Exposure[a] | p(NIPAm-co-PEGDA) | 50 | 200 | 12 | 2.4 |
| | p(NIPAm-co-PEGDA) w/ $Fe_3O_4$ Nanoparticles | 100 | 200 | 60 | 12 |
| Low Exposure[b] | p(NIPAm-co-PEGDA) | 50 | 150 | 10 | 1.5 |
| | p(NIPAm-co-PEGDA) w/ $Fe_3O_4$ Nanoparticles | 100 | 200 | 50 | 10 |

[b]The lower exposure is utilized for improved structural stability. The lower exposure is utilized for all the vapor generation rates reported in the paper except for the saline water experiment where the sample is fabricated with higher exposure[a].

To create the foam, two solutions were prepared and mixed. The first is a solution PEGDA 575 with 1.5 wt % of water-dispersible nano-TPO, while the second is a 50% water diluted acetic acid solution with sodium dodecyl sulfate (SDS) as a surfactant. Once the solutions were mixed thoroughly sodium bicarbonate is added to start the foaming process. The reaction between sodium bicarbonate and acetic acid produces aqueous sodium acetate, water, and carbon dioxide, which creates bubbles or air buckets in the hydrogel foam. The mixture was added promptly into a rectangular PDMS mold and covered by a glass slide moved into a curing oven with 6.25 W/cm$^2$ power density for 5 min. The synthesized foams are allowed to swell in water to wash away any residual salt and produced sodium acetate, which is a byproduct of the acetic acid and sodium bicarbonate reaction.

A projection micro-Stereolithography (PµSL) 3D printer with 405 nm UV-LED light may be utilized for fabricating the hydrogel-based SVG devices. After printing, the fabricated structure is blown with compressed air and then followed with the base treatments for the absorber layer. The water evaporation experiments were conducted under a solar simulator with a tuneable simulated solar flux up to 1500 W/m$^2$ (1.5 sun). The 3D printed SVG with a 1 cm$^2$ square surface area and a total thickness of 5-7 mm were floated in pure water under a solar flux of (0.5-1.5 sun). The device is thermally isolated and supported with foam floating on the water reservoir. The water mass loss was measured by a laboratory balance, and the evaporation rates were assessed after stabilization under one sun for 30 minutes.

Utilizing the bulk water and the hydrogel assisted dark evaporation rates, the equivalent vaporization enthalpy is found by assuming identical superficial area power input:

$$U_{in} = \Delta H_{vap} m_0 = \Delta H_{eq} m_h \qquad (1)$$

where $\Delta H_{vap}$ and $m_0$ are the evaporation enthalpy and mass change of bulk water; $m_h$, is the mass change for the hydrogel assisted dark evaporation. The resulting equivalent evaporation enthalpy of water in hydrogel $\Delta H_{eq}$ is ~500 J g$^{-1}$ which is significantly reduced when compared with bulk water.

The maximum possible vapor generation rate can be found from Equation 2, assuming complete photothermal energy conversion and no losses:

$$\dot{m}_{max} = \frac{\eta E_{in}}{\Delta H_{eq}} \qquad (2)$$

Wherein $\eta$ is the photothermal energy conversion efficiency, $E_{in}$ is solar radiation power density and $\Delta H_{eq}$ is equivalent vaporization enthalpy of water within the hydrogel. The results of the calculations are summarized in Table 3.

TABLE 3

| Evaporation rates and equivalent vaporization enthalpy in p(NIPAm-co-PEGDA) hydrogel | | | |
|---|---|---|---|
| Bulk water dark evaporation rate (kg m$^{-2}$ h$^{-1}$) | Hydrogel assisted dark evaporation rate (kg m$^{-2}$ h$^{-1}$) | Equivalent vaporization enthalpy (J/g) | Maximum possible vapor generation rate (kg m$^{-2}$ h$^{-1}$) |
| 0.225 | 1.09 | 509.7 | 7.06 |

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims.

What is claimed is:

1. A method of printing a hydrogel-based device, the method comprising:
   contacting a monomer, a crosslinker, a photoinitiator, and a precursor iron-containing salt with a solvent to form an ink solution;
   printing the ink solution onto a substrate;
   exposing the ink solution to light, sufficient to form a light-cured hydrogel; and
   alkalinizing by contacting the light-cured hydrogel with a base reducing agent sufficient to coprecipitate Fe$^{3+}$ and Fe$^{2+}$ in alkaline conditions to form nanoparticles including Fe$_3$O$_4$, wherein the Fe$^{3+}$ and Fe$^{2+}$ are provided at least in part by the precursor iron-containing salt.

2. The method of claim 1, wherein the monomer includes an acrylamide monomer or acrylic-based hydrogel.

3. The method of claim 2, wherein the acrylamide monomer includes N-isopropylacrylamide.

4. The method of claim 1, wherein the crosslinker includes poly(ethylene glycol) diacrylate or N,N'-Methylenebis(acrylamide).

5. The method of claim 1, wherein the photoinitiator includes 2,4,6-trimethylbenzoyl-diphenylphosphine oxide or 2-Hydroxy-2-methylpropiophenone.

6. The method of claim 1, wherein the solvent includes water.

7. The method of claim 1, wherein the precursor iron-containing salt includes Fe(NO$_3$)$_3$ and FeCl$_2$.

8. The method of claim 1, wherein the base reducing agent includes one or more of NH$_4$OH, KOH, KCl, NaOH, and NaBH$_4$.

9. The method of claim 1, wherein the substrate includes a foam, membrane, or flat non-porous surface.

10. The method of claim 1, wherein the nanoparticles further include at least one of wustite nanoparticles, hematite nanoparticles, and maghemite nanoparticles.

11. A method of printing a hydrogel-based device, the method comprising:
   contacting a first monomer, a first crosslinker, and a first photoinitiator with a first solvent to form a first ink solution;
   printing the first ink solution onto a substrate;
   exposing the first ink solution to light, sufficient to form a base hydrogel layer;
   contacting a second monomer, a second crosslinker, a second photoinitiator, and a precursor salt with a second solvent to form a second ink solution;
   printing the second ink solution onto the base hydrogel layer;
   exposing the second ink solution to light, sufficient to form one or more additional hydrogel layers; and
   swelling at least one of the one or more additional hydrogel layers in a liquid base reducing agent sufficient for alkalinization to precipitate nanoparticles from the precursor salt in the one or more additional hydrogel layers.

12. The method of claim 11, wherein one or more of the first monomer and the second monomer include an acrylamide monomer or acrylic-based monomer.

13. The method of claim 11, wherein the precursor salt includes one or more of $Fe(NO_3)_3$, $FeCl_2$, $FeCl_3$, $FeSO_4$, $Fe_2(SO_4)$, $Cu(NO_3)_2$, $Zn(NO_3)_2$, $Zn(CH_3CO_2)_2$, $NiSO_4$ and $Ag(NO_3)_2$.

14. The method of claim 11, wherein the nanoparticles include metal oxide nanoparticles.

15. The method of claim 11, wherein one or more of the first ink solution and the second ink solution further comprise a dye for controlling layer thickness in a printing process.

16. A method of preparing a hydrogel-based structure, comprising:

printing a photocurable composition onto a substrate, wherein the photocurable composition includes a monomer, a crosslinker, a photoinitiator, a metal-containing precursor salt, and a solvent;

exposing the photocurable composition to actinic radiation sufficient to form an at least partially crosslinked hydrogel; and swelling the at least partially crosslinked hydrogel in a liquid base reducing agent sufficient for alkalinization to form a composite structure including a plurality of metal oxide nanoparticles, wherein the metal oxide nanoparticles are formed from the metal-containing precursor salt.

17. The method of claim 16, wherein the metal-containing precursor salt includes $Fe(NO_3)_3$ and $FeCl_2$.

18. The method of claim 16, wherein the plurality of metal oxide nanoparticles includes $Fe_3O_4$ nanoparticles.

19. The method of claim 18, wherein the monomer includes an acrylamide monomer.

* * * * *